US011170293B2

(12) United States Patent
Gao et al.

(10) Patent No.: US 11,170,293 B2
(45) Date of Patent: Nov. 9, 2021

(54) MULTI-MODEL CONTROLLER

(71) Applicant: Microsoft Technology Licensing, LLC, Redmond, WA (US)

(72) Inventors: Jianfeng Gao, Woodinville, WA (US); Li Deng, Redmond, WA (US); Xiaodong He, Sammamish, WA (US); Prabhdeep Singh, Newcastle, WA (US); Lihong Li, Redmond, WA (US); Jianshu Chen, Redmond, WA (US); Xiujun Li, Tianjin (CN); Ji He, Nanjing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1341 days.

(21) Appl. No.: 14/985,017

(22) Filed: Dec. 30, 2015

(65) Prior Publication Data

US 2017/0193360 A1 Jul. 6, 2017

(51) Int. Cl.
*G06N 3/08* (2006.01)
*G06N 3/04* (2006.01)

(52) U.S. Cl.
CPC .......... *G06N 3/08* (2013.01); *G06N 3/0445* (2013.01); *G06N 3/0454* (2013.01)

(58) Field of Classification Search
CPC ....... G06N 3/08; G06N 3/0445; G06N 3/0454
USPC .......................................................... 706/25
See application file for complete search history.

(56) References Cited

U.S. PATENT DOCUMENTS

| | | | |
|---|---|---|---|
| 6,581,048 B1 * | 6/2003 | Werbos | G05B 13/0265 706/23 |
| 7,366,705 B2 | 4/2008 | Zeng et al. | |
| 7,734,471 B2 | 6/2010 | Paek et al. | |
| 8,055,606 B2 | 11/2011 | Kreamer et al. | |
| 8,285,581 B2 | 10/2012 | Abe et al. | |

(Continued)

FOREIGN PATENT DOCUMENTS

| | | |
|---|---|---|
| WO | 2014127812 | 8/2014 |
| WO | 2014134617 | 9/2014 |

OTHER PUBLICATIONS

Time Series Classification Using Multi-Channels Deep Convolutional Neural Network (Year: 2014).*

(Continued)

*Primary Examiner* — Kakali Chaki
*Assistant Examiner* — Ababacar Seck
(74) *Attorney, Agent, or Firm* — Schwegman Lundberg & Woessner, P.A.

(57) ABSTRACT

A processing unit can operate a first recurrent computational model (RCM) to provide first state information and a predicted result value. The processing unit can operating a first network computational model (NCM) to provide respective expectation values of a plurality of actions based at least in part on the first state information. The processing unit can provide an indication of at least one of the plurality of actions, and receive a reference result value, e.g., via a communications interface. The processing unit can train the first RCM based at least in part on the predicted result value and the reference result value to provide a second RCM, and can train the first NCM based at least in part on the first state information and the at least one of the plurality of actions to provide a second NCM.

12 Claims, 11 Drawing Sheets

(56) References Cited

U.S. PATENT DOCUMENTS

| | | | |
|---|---|---|---|
| 9,008,840 | B1 | 4/2015 | Ponulak et al. |
| 9,104,186 | B2 | 8/2015 | Sinyavskiy et al. |
| 9,679,258 | B2* | 6/2017 | Mnih ................. G06N 3/08 |
| 2002/0018127 | A1* | 2/2002 | Tani .................. G05B 13/027 |
| | | | 348/222.1 |
| 2012/0083924 | A1* | 4/2012 | Jones .................. B25J 5/007 |
| | | | 700/258 |
| 2014/0201126 | A1 | 7/2014 | Zadeh et al. |
| 2015/0170640 | A1* | 6/2015 | Sak .................... G10L 15/16 |
| | | | 704/232 |
| 2015/0278686 | A1 | 10/2015 | Cardinaux et al. |
| 2017/0140266 | A1* | 5/2017 | Wang ................ G06N 3/0472 |

OTHER PUBLICATIONS

Playing Atari with Deep Reinforcement Learning Mnih et al. (Year: 2013).*
Artificial Muscles: Actuators for Biorobotic Systems Klute et al. (Year: 2002).*
Mixed Reinforcement Learning for Partially Observable Markov Decision Process Dung et al. (Year: 2007).*
Deep Recurrent Q-Learning for Partially Observable MDPs Hausknecht et al. (Year: 2015).*
Personalized Ad Recommendation Systems for Life-Time Value Optimization with Guarantees Theocharous et al. (Year: 2015).*
Bakker, Bram, "Reinforcement Learning with Long Short-Term Memory", In Proceedings of Advances in Neural Information Processing Systems, Dec. 3, 2001, 8 pages.
Berry, et al., "Data Mining Techniques: For Marketing, Sales, and Customer Relationship Management", In Publication of John Wiley & Sons, Mar. 2004, 672 pages.
Deng, et al., "Deep Learning: Methods and Applications", In Journal of Foundations and Trends in Signal Processing, vol. 7, Issue 34, Jun. 2014, 197 pages.
Deng, et al., "Recent Advances in Deep Learning for Speech Research at Microsoft", In Proceedings of IEEE International Conference on Acoustics, Speech, and Signal Processing, May 26, 2015, 5 pages.
Dwyer, F. Robert, "Customer Lifetime Valuation to Support Marketing Decision Making", In Journal of Direct Marketing, vol. 11, Issue 4, Jan. 1997, 2 pages.
Hausknecht, et al., "Deep Recurrent Q-Learning for Partially Observable MDPs", In Journal of Computing Research Repository, Jul. 2015, 9 pages.
Hochreiter, et al., "Long Short-Term Memory", In Journal of Neural Computation, vol. 9, Issue 8, Nov. 15, 1997, pp. 1-32.
Kaelbling, et al., "Planning and Acting in Partially Observable Stochastic Domains", In Journal of Artificial Intelligence, vol. 101, Issues 12, May 1998, pp. 99-134.
Kumar, et al., "Customer Relationship Management: Concept, Strategy, and Tools", In Publication of Springer-Verlag Berlin Heidelberg, Oct. 21, 2012, 2 pages.

Lagoudakis, et al., "Least-Squares Policy Iteration", In Journal of Machine Learning Research, Dec. 2003, pp. 1107-1149.
Lillicrap, et al., "Continuous Control with Deep Reinforcement Learning," Google Deepmind, retrieved Sep. 9, 2015, 14 pages.
Lin, Long-Ji, "Reinforcement learning for robots using neural networks", In Ph.D. Dissertation of Doctor of Philosophy, Jan. 6, 1993, 168 pages.
Marivate, Vukosi N., "Improved Empirical Methods in Reinforcement-Learning Evaluation", In Doctoral Dissertation of Doctor of Philosophy, Jan. 2015, 148 pages.
McCallum, Andrew Kachites, "Reinforcement learning with selective perception and hidden state", In PhD Thesis of Doctor of Philosophy, Retrieved on: Oct. 8, 2015, 157 pages.
Mnih, et al., "Human-Level Control through Deep Reinforcement Learning", In Journal of Nature, vol. 518, Issue 7540, Feb. 2015, 5 pages.
Mnih, et al., "Playing Atari with Deep Reinforcement Learning", In Proceedings of Twenty-seventh Annual Conference on Neural Information Processing Systems, Dec. 5, 2013, pp. 1-9.
Narasimhan, et al., "Language Understanding for Text-based Games using Deep Reinforcement Learning", In Proceedings of Conference on Empirical Methods in Natural Language Processing, Sep. 17, 2015, 11 pages.
Netzer, et al., "A Hidden Markov Model of Customer Relationship Dynamics", In Journal of Marketing Science, vol. 27, Issue 2, Mar. 2008, pp. 185-204.
Oh, et al., "Action-conditional video prediction using deep networks in Atari games", In Proceedings of Computer Research Repository, Jul. 2015, pp. 1-43.
Pednault, et al., "Sequential cost-sensitive decision-making with reinforcement learning", In Proceedings of the Eighth ACM SIGKDD International Conference on Knowledge Discovery and Data Mining, Jul. 23, 2002, 10 pages.
Pineau, et al., "Point-based value iteration: An anytime algorithm for POMDPs", In Proceedings of the 18th international joint conference on Artificial Intelligence, Aug. 9, 2003, 6 pages.
Schafer, Anton M., "Reinforcement Learning with Recurrent Neural Network", In PhD Thesis, Oct. 31, 2008, 112 pages.
Silver, et al., "Concurrent reinforcement learning from customer interactions", In Proceedings of the 30th International Conference on Machine Learning, Jun. 16, 2013, 9 pages.
Sutton, et al., "Reinforcement Learning: An Introduction", In Proceedings of the MIT Press, Feb. 1998, 47 pages.
Tesauro, Gerald, "Temporal difference learning and TD-Gammon", In Magazine of the Communications of the ACM, vol. 38, Issue 3, Mar. 1995, pp. 58-68.
Tkachenko, Yegor, "Autonomous CRM Control via CLV Approximation with Deep Reinforcement Learning in Discrete and Continuous Action Space", In Journal of Computing Research Repository, Apr. 2015, pp. 1-13.
Williams, et al., "Partially Observable Markov Decision Processes for Spoken Dialog Systems", In Journal of Computer Speech and Language, vol. 21, Issue 2, Apr. 2007, pp. 393-422.

* cited by examiner

MULTI-MODEL CONTROLLER

BACKGROUND

Artificial neural networks (hereinafter "neural networks") are useful for a range of problems. For example, some control techniques use deep neural network (DNN) models, e.g., neural networks with multiple hidden layers, for determining a control action corresponding to a sensory input such as an image. Other control schemes use open-loop and/or closed-loop control systems.

SUMMARY

This disclosure describes systems, methods, and computer-readable media for training computational models, such as recurrent neural networks (RNNs) and/or Q networks for reinforcement learning (RL), and for using the trained computational models in, e.g., performing control tasks. In some examples, a computing device operates a first recurrent computational model (RCM) to provide first state information and a predicted result value. The computing device operates a first network computational model (NCM) to provide respective expectation values of a plurality of actions based at least in part on the first state information. The computing device provides an indication of at least one of the plurality of actions via a communications interface and receives a reference result value via the communications interface. The computing device trains the first RCM based at least in part on the predicted result value and the reference result value to provide a second RCM. The computing device trains the first NCM based at least in part on the first state information and the at least one of the plurality of actions to provide a second NCM. According to example techniques described herein, the first RCM can include a recurrent neural network and the computing device can train the first RCM using a supervised-learning update rule. According to example techniques described herein, the first NCM can include a recurrent neural network and the computing device can train the first NCM using a reinforcement-learning update rule.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

DETAILED DESCRIPTION

Overview

Figure 1:
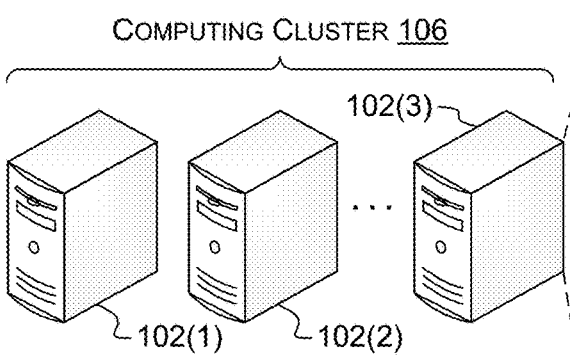
FIG. 1 is a block diagram depicting example scenarios for implementing training and operation of computational models as described herein.
Figure 1:
Figure 1:
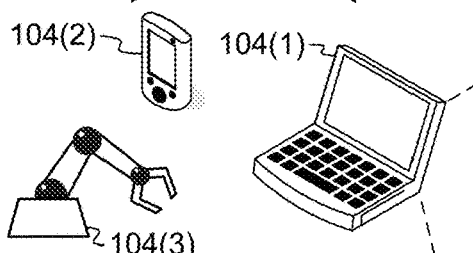
Figure 1:
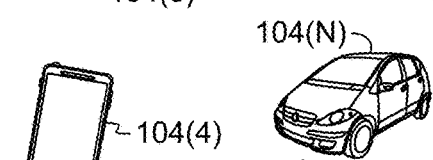
Figure 1:
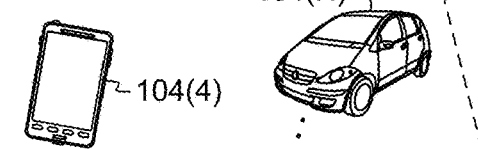
Figure 1:
Figure 1:

Examples described herein provide techniques and constructs to improve the training and operation of computational models, e.g., deep neural networks (DNNs) having multiple hidden layers. Examples described herein provide techniques and constructs to improve the control of systems and/or components of a control system's environment. Some examples use a recurrent computational model (RCM) such as a recurrent neural network (RNN) to transform observations of the environment into state information. This permits tracking state over a period of time, rather than only a most-recent observation of the environment. Some examples use a network computational model (NCM), such as a DNN trained using a reinforcement-learning update rule, referred to herein as a "Q network" or "Q-learning network" (QN) or, for multilayer implementations of QNs, "deep Q network" (DQN). Some examples use QNs to determine an action to be taken based on the state information. This permits determining actions based on both short- and long-term contributions to achieving a goal of the control system, rather than merely based on short-term value.

Some examples train an RCM and an NCM using separate but coordinated training processes. This can permit training and operating computational models with more efficient usage of processing units, e.g., since each individual computational model is smaller than would be a combined model. Prior schemes that train an aggregate network that includes both supervised-learning and reinforcement-learning components do not provide this advantage. Some examples use ongoing, separate but coordinated training over time to improve control effectiveness in the presence of changes in trends in the input data over time. Prior schemes that train a neural network and then subsequently train a Q network do not provide this advantage. Moreover, using separate but coordinated training processes can provide improved numerical stability of the training process compared to prior schemes. This can reduce the amount of time and memory required to train the computational models, and can improve the robustness of the trained models compared to prior schemes.

Some examples use processing units provisioned as part of a cluster computing systems ("computing cluster" or "cluster") having several discrete computing nodes that work together to accomplish a computing task assigned to the cluster as a whole. Some such systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

In various examples, e.g., of computational models trained for control tasks and/or other use cases noted herein, the computational models may include artificial neurons, e.g., as found in multilayer perceptrons and/or other neural networks. A neural network can have none, one or more, or at least two hidden layers. The techniques described herein may include the use of an algorithm to parallelize the training of the DNNs across multiple processing units, e.g., cores of a multi-core processor and/or multiple general-purpose graphics processing units (GPGPUs). Accordingly, multiple layers of DNNs may be processed in parallel on the multiple processing units. Neural networks such as DNNs are commonly trained with minibatch-based stochastic gradient descent (SGD). SGD can be parallelized along three dimensions, model parameters, layers, and data (and combinations thereof). Other frameworks besides SGD can be used, e.g., minibatch non-stochastic gradient descent and/or other mathematical-optimization techniques.

In some examples, an RCM can include artificial neurons interconnected so that the output of a first unit can serve as a later input to the first unit and/or to another unit not in the layer immediately following the layer containing the first unit. Examples include Elman networks in which the outputs of hidden-layer artificial neurons are fed back to those neurons via memory cells, and Jordan networks, in which the outputs of output-layer artificial neurons are fed back via the memory cells. In some examples, an RCM can include one or more long short-term memory (LSTM) units, e.g., as discussed below with reference to FIG. 5. In some examples, neuron parameters of artificial neurons in an RCM can be determined using a supervised-learning update rule.

In some examples, an NCM can include artificial neurons, e.g., interconnected to form a multilayer perceptron. In some examples, neuron parameters of artificial neurons in an NCM can be determined using a reinforcement-learning update rule.

In some examples, algorithms for computational-model training as described herein can be performed on a computing device, such as a smart phone, a tablet, a desktop computer, a server, a server blade, a supercomputer, etc. The resulting models can be used on such computing devices and/or on computing devices having one or more input devices, such as a physical keyboard, a soft keyboard, a touch screen, a touch pad, microphone(s), and/or camera(s). Models trained as described herein can be operated to provide optimized functions such as control of bioreactors, pick-and-place robots, autonomous mobile robots, and/or other robots; robot motion planning; elevator dispatching; consumer relationship management (CRM); resource allocation, e.g., communications channel allocation and/or job-shop scheduling; and/or traffic planning, analysis, and/or control, e.g., for traffic signal lights on roadways.

Various environments, configurations of electronic devices, and methods for training and using computational models, e.g., for control applications, are described further with reference to FIGS. 1-11. While many examples described herein relate to servers and other non-consumer electronic devices, other types of electronic devices can be used, e.g., as discussed with reference to FIG. 1.

Illustrative Environment

FIG. 1 shows an example scenario 100 in which examples of computational model training systems, e.g., deep neural network (DNN) training systems or multi-model training systems, can operate and/or in which computational-model training and/or use methods such as those described herein can be performed. In the illustrated example, the various devices and/or components illustrated in scenario 100 include computing device(s) 102(1)-102(N) (individually and/or collectively referred to herein with reference 102), where N is any integer greater than and/or equal to 1, e.g., distributed computing resource(s), and computing devices 104(1)-104(K) (individually and/or collectively referred to herein with reference 104), where K is any integer greater than and/or equal to 1. In some examples, N=K; in other examples, N>K or N<K. Although illustrated as, e.g., desktop computers, laptop computers, tablet computers, and/or cellular phones, computing device(s) 102 and/or 104 can include a diverse variety of device categories, classes, and/or types and are not limited to a particular type of device. In the illustrated example, computing device(s) 102(1)-102(N) can be computing nodes in a computing cluster 106, e.g., a cloud service such as MICROSOFT AZURE. In the illustrated example, computing device(s) 104 can be clients of cluster 106 and can submit jobs to cluster 106 and/or receive job results from cluster 106. Computing devices 102(1)-102(N) in cluster 106 can, e.g., share resources, balance load, increase performance, and/or provide fail-over support and/or redundancy. Computing devices 104 can additionally or alternatively operate in a cluster and/or grouped configuration.

By way of example and not limitation, computing device(s) 102 and/or 104 can include, but are not limited to, server computers and/or blade servers such as Web servers, map/reduce servers and/or other computation engines, and/or network-attached-storage units (e.g., 102(1)), laptop computers, thin clients, terminals, and/or other mobile computers (e.g., 104(1)), wearable computers such as smart watches and/or biometric and/or medical sensors, implanted computing devices such as biometric and/or medical sensors, computer navigation client computing devices, satellite-based navigation system devices including global positioning system (GPS) devices and/or other satellite-based navigation system devices, personal data assistants (PDAs), and/or other specialized portable electronic devices (e.g., 104(2)), robots and/or other systems incorporating sensor(s) for measuring, and/or actuator(s) for affecting, physical objects and/or properties in the real world (e.g., 104(3)), tablet computers, tablet hybrid computers, smartphones, mobile phones, mobile phone-tablet hybrid devices, and/or other telecommunication devices (e.g., 104(4)), sensors and/or other devices or systems for detecting characteristics of an environment, such as thermal, optical, vibratory, pressure, weather, and/or other sensors (e.g., 104(5)), portable and/or console-based gaming devices and/or other entertainment devices such as network-enabled televisions, set-top boxes, media players, cameras, and/or personal video recorders (PVRs) (e.g., 104(6), represented graphically as a gamepad), automotive computers such as vehicle control systems, vehicle security systems, and/or electronic keys for vehicles (e.g., 104(N), represented graphically as an automobile), desktop computers, and/or integrated components for inclusion in computing devices, appliances, and/or other computing device(s) configured to participate in and/or carry out computational-model training and/or operation as described herein, e.g., for control purposes. In some examples, as indicated, computing device(s), e.g., computing devices 102(1) and 104(1), can intercommunicate to participate in and/or carry out computational-model training and/or operation as described herein. For example, computing device 104(5) can be a data source and computing device 102(2) can be a computational-model training system, as described below with reference to, e.g., FIGS. 2-6.

Different devices and/or types of computing devices 102 and 104 can have different needs and/or ways of interacting with cluster 106. For example, computing devices 104 can interact with cluster 106 with discrete request/response communications, e.g., for sensor updates and control responses using an already-trained model. Additionally and/or alternatively, computing devices 104 can be data sources and can interact with cluster 106 with discrete and/or ongoing transmissions of data to be used as input to a computational model. For example, a data source in an automobile, e.g., a computing device 104(N), can provide to cluster 106 data of location and environmental conditions around the car. This can provide improved accuracy of control systems by increasing the amount of data input to the control model. Additionally and/or alternatively, computing devices 104 can be data sinks and can interact with cluster 106 with discrete and/or ongoing requests for data output from a computational model, e.g., control outputs to control actuators such as computing device 104(3).

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Private networks can include isolated networks not connected with other networks, such as MODBUS, FIELDBUS, and/or Industrial Ethernet networks used internally to factories for machine automation. Private networks can also include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 108 can also include any type of wired and/or wireless network, including but not limited to local area networks (LANs), wide area networks (WANs), satellite networks, cable networks, Wi-Fi networks, WiMAX networks, mobile communications networks (e.g., 3G, 4G, and so forth) and/or any combination thereof. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, and/or FIBRE CHANNEL switches and/or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, and/or WiMAX.

Different networks have different characteristics, e.g., bandwidth, latency, accessibility (open, announced but secured, and/or not announced), and/or coverage area. The type of network 108 used for any given connection between, e.g., a computing device 104 and cluster 106 can be selected based on these characteristics and on the type of interaction. An example data source can be a real-time data and/or video stream from a drone and/or other remotely-operated vehicle. Such a video stream can be carried via high-bandwidth, low-latency networks. By contrast, low-bandwidth networks can be used to carry data such as measurements from environmental sensors such as temperature sensors. Such sensors can provide infrequent updates, e.g., one value per minute of a gradually changing temperature.

In some examples, computing devices 102 and/or 104, e.g., robots, sensors, actuators, laptops, and/or other computing devices 102 and/or 104 described above, interact with an environment 110. The environment 110 can include systems, devices, parties, and/or other features and/or entities with which computing devices 102 and/or 104 can interact. In an example, computing devices 102 operate computational models to determine an action to be taken, and transmit an indication of the action via network 108 to computing device 104(3), a robot. Computing device 104(3) takes the action, e.g., by grasping a workpiece. Computing device 104(5), e.g., a pressure sensor, detects that computing device 104(3) has grasped the workpiece. Computing device 104(5) then transmits an indication of the detected pressure, and/or an indication that the workpiece has been grasped, via network 108 to computing devices 102. Computing devices 102 then update one or more of the computational models, and/or determine a new action. Examples of this process are discussed in more detail below with reference to FIGS. 3-11 and Table 2.

Still referring to the example of FIG. 1, details of an example computing device 102(3) are illustrated at inset 112. The details of example computing device 102(3) can be representative of others of computing device(s) 102. However, each of the computing device(s) 102 can include additional or alternative hardware and/or software components. The illustrated computing device 102(2) can include one or more processing unit(s) 114 operably connected to one or more computer-readable media 116, e.g., memories, such as via a bus 118, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof. In some examples, plural processing units 114 can exchange data through an internal interface bus (e.g., PCIe), rather than and/or in addition to network 108. While the processing units 114 are described as residing on the computing device 102(3), in this example, the processing units 114 can also reside on different computing device(s) 102 and/or 104 in some examples. In some examples, at least two of the processing units 114 can reside on different computing device(s) 102 and/or 104. In such examples, multiple processing units 114 on the same computing device 102 and/or 104 can use a bus 118 of the computing device 102 and/or 104 to exchange data, while processing units 114 on different computing device(s) 102 and/or 104 can exchange data via network(s) 108.

Computer-readable media described herein, e.g., computer-readable media 116, includes computer storage media and/or communication media. Computer storage media includes tangible storage units such as volatile memory, nonvolatile memory, and/or other persistent and/or auxiliary computer storage media, removable and non-removable computer storage media implemented in any method and/or technology for storage of information such as computer-readable instructions, data structures, program modules, and/or other data. Computer storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In contrast to computer storage media, communication media can embody computer-readable instructions, data structures, program modules, and/or other data in a modulated data signal, such as a carrier wave, and/or other transmission mechanism. As defined herein, computer storage media does not include communication media.

In some examples, computer-readable media 116 can store instructions executable by the processing unit(s) 114 that, as discussed above, can represent a processing unit incorporated in computing device 102. Computer-readable media 116 can additionally and/or alternatively store instructions executable by external processing units such as by an external central processing unit (CPU) and/or external processor of any type discussed herein. In some examples at least one processing unit 114, e.g., a CPU, graphics processing unit (GPU), and/or hardware logic device, can be incorporated in computing device 102, while in some examples at least one processing unit 114, e.g., one or more of a CPU, GPU, and/or hardware logic device, can be external to computing device 102.

Computer-readable media 116 can store, for example, computer-executable instructions of an operating system (omitted for brevity), module(s) of a representation engine 120, module(s) of a action engine 122, module(s) of a communications engine 124, and/or other modules, programs, and/or applications that are loadable and executable by processing unit(s) 114. In some examples not shown, one or more of the processing unit(s) 114 in one of the computing device(s) 102 and/or 104 can be operably connected to computer-readable media 116 in a different one of the computing device(s) 102 and/or 104, e.g., via communications interface and network 108. For example, program code to perform steps of flow diagrams herein, e.g., as described herein with reference to action engine 122, can be downloaded from a server, e.g., computing device 102(1), to a client, e.g., computing device 104(K), e.g., via the network 108, and executed by one or more processing unit(s) in computing device 104(K). For example, the computer-executable instructions stored on the computer-readable media 116 can upon execution configure a computer such as a computing device 102 and/or 104 to perform operations described herein with reference to the operating system, the representation engine 120, the action engine 122, and/or the communications engine 124.

Computer-readable media 116 can also store, for example, one or more computational model(s) 126, individually and/or collectively referred to herein with reference 126. The computational model 126 can include, e.g., one or more DNNs, recurrent neural networks (RNNs), deep RNNs (DRNNs), Q-learning networks (QNs) or deep Q-learning networks (DQNs) as described above, and/or any combination thereof. Example RNNs can include long short-term memory (LSTM) units, e.g., as discussed below with reference to FIG. 5. As noted above, the computational models 126 can include, e.g., activation weights, functions, and/or thresholds (collectively "parameters") for artificial neurons and/or other computational units (e.g., LSTM units) of one or more neural networks. The representation engine 120 and/or the action engine 122 can determine values of parameters computational models 126 and can use the determined parameters values of computational model 126 to perform, e.g., control, extrapolation, forecasting, and/or other data analysis and/or processing. The communications engine 124 can communicate information, e.g., between computational models 126 designed to serve as control systems and an environment with which the control system interacts.

Processing unit(s) 114 can be and/or include one or more single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing units 114 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 114 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104 can include a plurality of processing units 114 of multiple types. For example, the processing units 114 in computing device 102(3) can be a combination of one or more GPGPUs and one or more FPGAs. Different processing units 114 can have different execution models, e.g., as is the case for graphics processing units (GPUs) and central processing unit (CPUs).

Computing device 102 can also include one or more communications interfaces 128 connected via the bus 118 to processing units 114 to enable wired and/or wireless communications between computing device(s) 102 and other networked computing devices 102 and/or 104 involved in cluster computing, and/or other computing device(s), e.g., over network(s) 108. Such communications interface(s) 128 can include one or more transceiver devices, e.g., network interface controllers (NICs) such as Ethernet NICs and/or other types of transceiver devices, to send and receive communications over a network. The processing units 114 can exchange data through respective communications interface(s) 128. In some examples, the communications interface 128 can include a PCI Express (PCIe) transceiver, and the network 108 can include a PCIe bus. In some examples, the communications interface 128 can include, but is not limited to, a transceiver for cellular (3G, 4G, and/or other), WI-FI, Ultra-wideband (UWB), BLUETOOTH, and/or satellite transmissions. The communications interface 128 can include a wired I/O interface, such as an Ethernet interface, a serial interface, a Universal Serial Bus (USB) interface, an INFINIBAND interface, and/or other wired interfaces. The communications interface 128 can additionally and/or alternatively include one or more user-interface devices, buses such as memory buses and/or local buses, memory interfaces, and/or hardwired interfaces such as 0-20 mA control lines. For simplicity, these and other components are omitted from the illustrated computing device 102(3).

As noted above, computer-readable media 116 of the computing device 102 can store an operating system. In some examples, an operating system is not used (commonly referred to as a "bare metal" configuration). In some examples, the operating system can include components that enable and/or direct the computing device 102 to receive data via various inputs (e.g., user controls, network and/or communications interfaces, memory devices, and/or sensors), and process the data using the processing unit(s) 114 to generate output. The operating system can further include one or more components that present the output (e.g., display an image on an electronic display, store data in memory, and/or transmit data to another computing device). The operating system can enable a user, e.g., an engineer, to interact with the computing device 102(3) using a user interface. Additionally, the operating system can include components that perform various functions generally associated with an operating system, e.g., storage management and internal-device management.

In some examples, computing device 102 can include a user interface 130 configured to permit a user, e.g., an engineer responsible for environment 110 and/or a neural-network administrator, to operate the representation engine 120, the action engine 122, and/or the communications engine 124. Some examples of user interface 130 are discussed below.

Details of an example computing device 104(1) are illustrated at inset 132. The details of example computing device 104(1) can be representative of others of computing device(s) 104. However, each of the computing device(s) 104 can include additional and/or alternative hardware and/or software components. Computing device 104(1) can include one or more processing unit(s) 134 operably connected to one or more computer-readable media 136, e.g., via a bus 138. Some examples of processing unit(s) 134 are discussed above with reference to processing unit(s) 114. Some examples of computer-readable media 136 are discussed above with reference to computer-readable media 116. For example, computer-readable media 136 can include one or more computer storage media. Some examples of bus 138 are discussed above with reference to bus 118.

Computer-readable media 136 can store, for example, computer-executable instructions of an operating system (omitted for brevity), a communications engine (omitted for brevity), a control program 140 and/or module(s) thereof, and/or other modules, programs, and/or applications that are loadable and executable by processing unit(s) 136. Some examples of the operating system are discussed above with reference to inset 112.

In some examples, computing device 104(1) can include (and/or be communicatively connected with) one or more sensors 142 and/or one or more actuators 144, in any combination. For example, computing device 104(1) can read values from one or more sensors and report those values to, e.g., a computing device 102 via, e.g., network 108. Sensors can report analog and/or digital values. Computing device 104(1) can convert analog values to digital (and/or vice versa) for transmission to computing device 102. Computing device 104(1) can receive commands, e.g., in analog and/or digital form, e.g., from computing device 102. Computing device 104(1) can operate actuator(s) 144 in response to the received commands. Examples of use cases, environments 110, sensors 142, and actuators 144 are given in Table 1.

TABLE 1

| Use Case | Environment includes: | Sensors record: | Actuators control: |
| --- | --- | --- | --- |
| Control of bioreactors | A tank in which chemicals are being combined under specified conditions | Temperature; Fluid volume in tank | Motor to stir the chemicals; Heater to control temperature |
| Control of pick-and-place robots | A workspace with a supply of parts and a conveyor belt carrying substrate to receive the parts | Substrate position; part quantity available; Actuator force; Joint position | Joint motors for a 2- to 6-axis manipulator; Motor for gripper |
| Control of autonomous mobile robots | An office, shop floor, academic, and/or other environment through which humans pass | Distance and direction to obstructions; Location | Motors for motion; Joint motors of an arm for opening doors |

TABLE 1-continued

| Use Case | Environment includes: | Sensors record: | Actuators control: |
| --- | --- | --- | --- |
| Robot joint-motion planning | Physical hardware of a robot | Joint positions | Joint motors |
| Elevator dispatching | A building with one or more elevators | Call-button presses; Car position | Car lift motor; Car door motors |
| Consumer relationship management (CRM) | A group of people with which a company and/or other party is interacting | Text and/or financial inputs from the people, e.g., donations and/or feedback | Printers and mailers to prepare mailings to people; E-mail services to send emails. |
| Communications channel allocation | Channels to be allocated to parties wishing to communicate | Count of channels in use; Requests for channels | Media-access system allocating channels. |
| Job-shop scheduling | Resources available to perform tasks of jobs | Availability of resources; Status of jobs | Allocation of resources to tasks |
| Traffic-signal control | A track or street system in which vehicles (e.g., trains and/or cars) operate | Traffic volume; Average speeds; Track occupancy | Traffic signals (green/red) |

In some examples, the control program 140 can be configured to cause the processing units 134 to read the sensor(s) 142 and operate the actuator(s) 144. In some examples, training and operation are carried out on a single computing device 104. In some of these examples, the control program 140 can be configured to cause the processing units 134 to read the sensor(s) 142, train and/or operate computational model(s) 126 using instructions of representation engine 120 and action engine 122, and operate the actuator(s) 144 according to the determined action.

In some examples, the computing device 104 can be configured to communicate with computing device(s) 102 to operate a neural network and/or other computational model 126. For example, the computing device 104 can transmit a request to computing device(s) 102 for an output of the computational model(s) 126, receive a response, and take action based on that response. In some examples, functions described herein can be shared between one or more computing device(s) 102 and one or more computing device(s) 104. For example, the computing device(s) 104 can operate an input layer of one or more neural network(s) and the computing device(s) 102 can operate a hidden layer of one or more neural network(s).

Computing device 104 can also include one or more communications interfaces 146 connected via the bus 138 to processing unit(s) 134 to enable wired and/or wireless communications between computing device(s) 104 and other networked computing devices 102 and/or 104 involved in cluster computing, and/or other computing device(s), over network(s) 108. Some examples are discussed above with reference to communications interface(s) 128.

In some examples, computing device 104 can include a user interface 148. For example, computing device 104(4) can provide user interface 148 to control and/or otherwise interact with cluster 106 and/or computing devices 102 therein. For example, processing unit(s) 134 can receive inputs of user actions via user interface 148 and transmit corresponding data via communications interface(s) 146 to computing device(s) 102.

User interfaces 130 and/or 148 can include one or more output devices configured for communication to a user and/or to another computing device 102 and/or 104. Output devices can be integral and/or peripheral to computing device 102 and/or 104. Examples of output devices can include a display, a printer, audio speakers, beepers, and/or other audio output devices, a vibration motor, linear vibrator, and/or other haptic output device, and the like. User interface 130 and/or 148 can include one or more input devices, integral and/or peripheral to computing device 102 and/or 104. The input devices can be user-operable, and/or can be configured for input from other computing device 102 and/or 104. Examples of input devices can include, e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, and the like.

Illustrative Components

Figure 2:
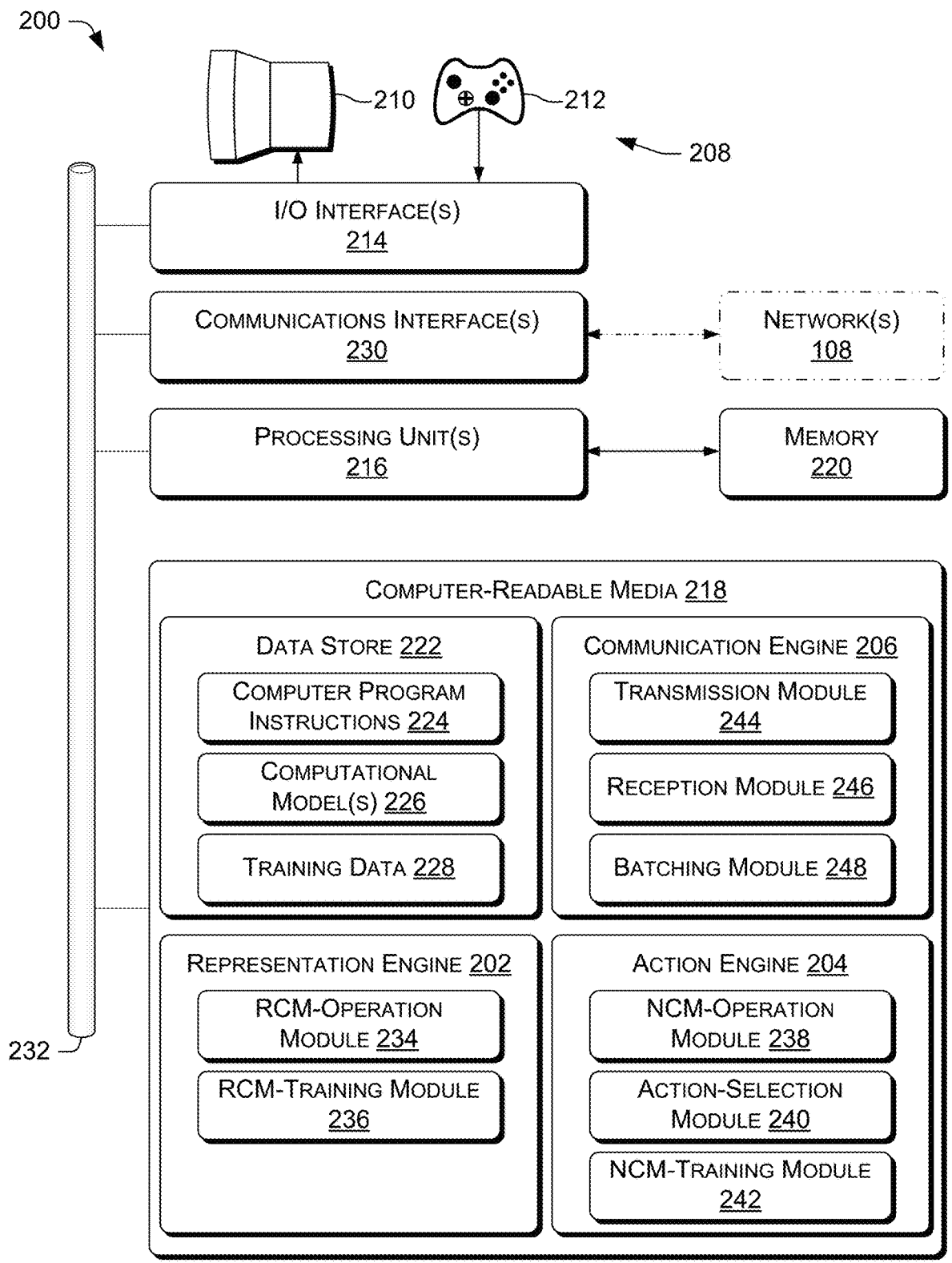
FIG. 2 is a block diagram depicting an example computing device configured to participate in training and operation of computational models according to various examples described herein.

FIG. 2 is an illustrative diagram that shows example components of an computing device 200, which can represent computing device(s) 102 and/or 104, and which can be and/or implement a DNN training and/or operation system, device, and/or apparatus, according to various examples described herein. Computing device 200 can implement a representation engine 202, which can represent representation engine 120, FIG. 1. Computing device 200 can implement an action engine 204, which can represent action engine 122, FIG. 1. Computing device 200 can implement a communications engine 206, which can represent communications engine 124, FIG. 1. Computing device 200 can include and/or be included in a system and/or device for training and/or operating a neural network and/or other computational model as described herein.

Computing device 200 can include and/or be connected to a user interface 208, which can represent user interface 130 and/or 148. User interface 208 can include a display 210. Display 210 can include an organic light-emitting-diode (OLED) display, a liquid-crystal display (LCD), a cathode-ray tube (CRT), and/or another type of visual display. Display 210 can be a component of a touchscreen, and/or can include a touchscreen. User interface 208 can include various types of output devices described above with reference to user interface 130 and/or 148. In some examples, computing device 200 can be communicatively connected with a user interface 148, FIG. 1, of another computing device.

User interface 208 can include a user-operable input device 212 (graphically represented as a gamepad). User-operable input device 212 can include various types of input devices described above with reference to user interface 130 and/or 148.

Computing device 200 can further include one or more input/output (I/O) interface(s) 214 to allow computing device 200 to communicate with input, output, and/or I/O devices (for clarity, some not depicted). Examples of such devices can include components of user interface 208 such as user-operable input devices and output devices described above with reference to user interface 130 and/or 148. Other examples of such devices can include power meters, accelerometers, and other devices for measuring properties of computing device 200 and/or its environment and/or of another computing device 102 and/or 104. Computing device 200 can communicate via I/O interface 214 with suitable devices and/or using suitable electronic/software interaction methods. Input data, e.g., of user inputs on user-operable input device 212 and/or of sensors 142, can be received via I/O interface(s) 214. Output data, e.g., of user interface screens, can be provided via I/O interface(s) 214 to display 210, e.g., for viewing by a user. Control data can be provided via I/O interface(s) 214 to actuators 144.

The computing device 200 can include one or more processing unit(s) 216, which can represent processing unit(s) 114 and/or 134. Processing units 216 can be operably coupled to the I/O interface 214 and to at least one computer-readable media 218, discussed below. Processing unit(s) 216 can include, e.g., processing unit types described above such as CPU-type and/or GPGPU-type processing unit(s). In some examples, processing unit(s) 216 can include and/or be connected to a memory 220, e.g., a RAM and/or cache.

In some examples, computer-readable media 218 of the computing device 200 can represent computer-readable media 116 and/or 136, FIG. 1, and can store a plurality of modules of the representation engine 202, the action engine 204, and/or the communications engine 206. Processing unit(s) 216 can be configured to execute modules of the plurality of modules. For example, the computer-executable instructions stored on the computer-readable media 218 can upon execution configure a computer such as a computing device 200 to perform operations described herein with reference to the modules of the plurality of modules. The modules stored in the computer-readable media 218 can include instructions that, when executed by the one or more processing units 216, cause the one or more processing units 216 to perform operations described below. Examples of modules in computer-readable media 218 are discussed below. Computer-readable media 218 can also include an operating system, e.g., as discussed above. Computer-readable media 218 can be computer storage media, as discussed above.

In the illustrated example, computer-readable media 218 includes a data store 222. In some examples, data store 222 can include data storage, structured and/or unstructured, such as a database (e.g., a Structured Query Language, SQL, and/or NoSQL database) and/or data warehouse. In some examples, data store 222 can include a corpus and/or a relational database with one or more tables, arrays, indices, stored procedures, and so forth to enable data access. Data store 222 can store data for the operations of processes, applications, components, and/or modules stored in computer-readable media 218 and/or computer instructions in those modules executed by processing unit(s) 216. In some examples, the data store can store computer program instructions 224 (e.g., instructions corresponding to processes described herein and/or to other software executable by processing unit(s) 216), one or more computational models 226, which can represent computational models 126, FIG. 1, training data 228, e.g., datasets, to be used for training and/or operation of the computational models 226, metadata, e.g., of data domains (discussed below), database schema(s), and/or any combination thereof. In some examples, computational models 226 can include artificial neurons, as discussed below.

The computing device 200 can also include a communications interface 230, which can represent communications interface 128 and/or 146. For example, communications interface 230 can include a transceiver device such as a network interface controller (NIC) to send and receive communications over a network 108 (shown in phantom), e.g., as discussed above. As such, the computing device 200 can have network capabilities. Communications interface 230 can include any number of network, bus, and/or memory interfaces, in any combination, whether packaged together and/or separately.

For example, the computing device 200 can exchange data with computing devices 102 and/or 104 (e.g., laptops, computers, and/or servers) via one or more network(s) 108, such as the Internet. In some examples, computing device 200 can receive data from one or more data source(s) (not shown) via one or more network(s) 108. Example data source(s) can include computing devices 102 and/or 104, sensors, data aggregators, and/or data feeds, e.g., via application programming interfaces (APIs). The processing units 216 can retrieve data from the data source(s), e.g., via an HTTP request such as a GET to a Web Services and/or Representational State Transfer (REST) API endpoint.

In some examples, the processing unit(s) 216 can access the module(s) on the computer-readable media 218 via a bus 232, which can represent bus 118 and/or 138, FIG. 1. I/O interface 214 and communications interface 230 can also communicate with processing unit(s) 216 via bus 232.

The modules of the representation engine 202 stored on computer-readable media 218 can include one or more modules, e.g., shell modules and/or API modules, which are illustrated a recurrent-computational-model (RCM)-operation module 234 and an RCM-training module 236.

The modules of the action engine 204 stored on computer-readable media 218 can include one or more modules, e.g., shell modules and/or API modules, which are illustrated as a network-computational-model (NCM)-operation module 238, an action-selection module 240, and an NCM-training module 242.

The modules of the communications engine 206 stored on computer-readable media 218 can include one or more modules, e.g., shell modules and/or application programming interface (API) modules, which are illustrated as a transmission module 244, a reception module 246, and a batching module 248.

In the representation engine 202, the action engine 204, and/or the communications engine 206, the number of modules can vary higher and/or lower, and modules of various types can be used in various combinations. For example, functionality described associated with the illustrated modules can be combined to be performed by a fewer number of modules and/or APIs and/or can be split and performed by a larger number of modules and/or APIs. For example, the RCM-operation module 234 and the RCM-training module 236 can be combined in a single module that performs at least some of the example functions described below of those modules, and likewise the NCM-operation module 238 and the NCM-training module 242, and/or the NCM-operation module 238 and the action-selection module 240. In some examples, computer-readable media 218 can include a subset of modules 234, 236, 238, 240, 242, 244, 246, and 248.

Figure 3:
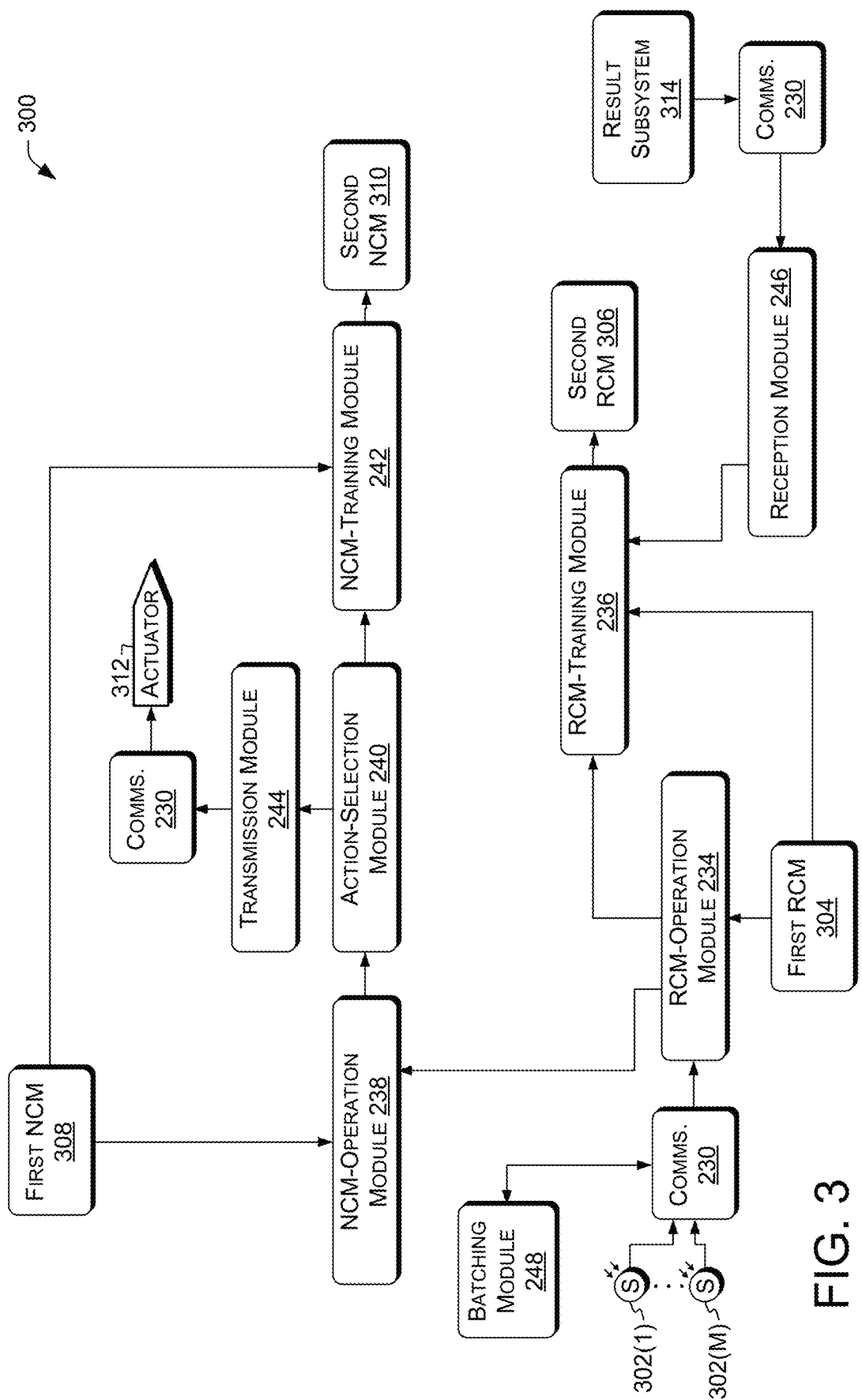
FIG. 3 is a dataflow diagram depicting example module interactions during training and operation of a computational model.

FIG. 3 is a dataflow diagram 300 illustrating example interactions between the modules illustrated in FIG. 2. For clarity, communications interface 230 is depicted multiple places in this figure. Such depiction does not constrain the number of communications interface(s) 230 that may be used. Further details of operations herein are described below with reference to at least FIGS. 4-6.

Data can be provided by one or more sensors 302(1)-302 (M) (individually and/or collectively referred to herein with reference 302). Sensors 302 can be coupled to the communications interface 230 and configured to provide reference observation values, as discussed herein.

In some examples, the RCM-operation module 234 can be configured to operate a first recurrent computational model (RCM) 304 to provide first state information and a predicted result value. In some examples, the RCM-operation module 234 can be configured to operate the first RCM 304 based at least in part on sensor readings from sensors 302.

In some examples, the RCM-training module 236 can be configured to train the first RCM 304 based at least in part on the predicted result value and a corresponding reference result value to provide a second RCM 306. In some examples, at least the first RCM 304 and/or the second RCM 306 comprises a recurrent neural network and the representation engine is configured to train the first RCM 304 using a supervised-learning update rule.

In some examples, the NCM-operation module 238 can be configured to operate a first network computational model (NCM) 308 to provide respective expectation values of a plurality of actions, and/or one or more actions, based at least in part on the first state information. The expectation values can indicate, represent, or correspond to, e.g., the expected long term value of or resulting from taking the respective actions. The operation of the NCM to provide the expectation values can be represented with a function Q(•), examples of which are given below.

In some examples, the action-selection module 240 can be configured to select an action of the plurality of actions based at least in part on one or more of the expectation values. For example, the action-selection module 240 can be configured to select the action of the plurality of actions corresponding to a highest expectation value of the one or more of the expectation values.

In some examples, the NCM-training module 242 can be configured to train the first NCM based at least in part on the first state information and the selected action to provide a second NCM 310. In some examples, at least the first NCM and/or the second NCM comprises a neural network and the action engine is configured to train the first NCM using a reinforcement-learning update rule.

In some examples, the transmission module 244 can be configured to provide an indication of the selected action via the communications interface 230. In some examples, one or more actuators 312, which can represent actuators 144, FIG. 1, are coupled to the communications interface 230 and responsive to the indication of the selected action to perform the selected action.

In some examples, the reception module 246 can be configured to receive the reference result value via the communications interface. The reception module 246 can then provide the reference result value to the RCM-training module 236.

In some of the illustrated examples, the training of the first RCM 304 and the first NCM 308 can be coordinated as shown. The NCM can be operated based on state information from the RCM-operation module 234. The RCM, in turn, can be trained based on a reference result value provided via the reception module 246. In some examples, the reference result value is received and/or otherwise provided via the reception module 246 subsequent to a corresponding provision of the indication of the selected action by the transmission module 244. For example, the actuator 312 can affect the environment 110, FIG. 1, and in turn the sensors 302 can detect corresponding states of and/or changes in the environment 110.

In some examples, a result subsystem 314 can be coupled to the communications interface 230. The result subsystem 314 can be configured to provide the reference result value. In some examples, the result subsystem 314 can include sensors, processors, and/or other components described above with reference to computing devices 102 and/or 104, FIG. 1. The result subsystem 314 can, e.g., determine the reference result value as a function of readings from one or more of the sensors 302, and/or by executing a database query or other function to summarize or aggregate received data, e.g., of customer responses to mailings in a CRM use case.

In some examples, batching module 248 can be coupled to the communications interface 230. Batching module 248 can be configured to provide minibatches of training data 228, e.g., as discussed below with reference to Table 2.

In some examples, the RCM-operation module 234 can be further configured to operate the second RCM 306 to provide second state information. In some of these examples, the NCM-training module 242 can be configured to train the first NCM further based on the second state information.

In some examples, the RCM-operation module 234 can be further configured to operate the first RCM 304 to provide a predicted observation value. In some of these examples, the RCM-training module 236 can be configured to train the first RCM further based on the predicted observation value and a reference observation value, e.g., from sensors 302. In some examples, the reception module 246 is further configured to receive the reference observation value.

Figure 4:
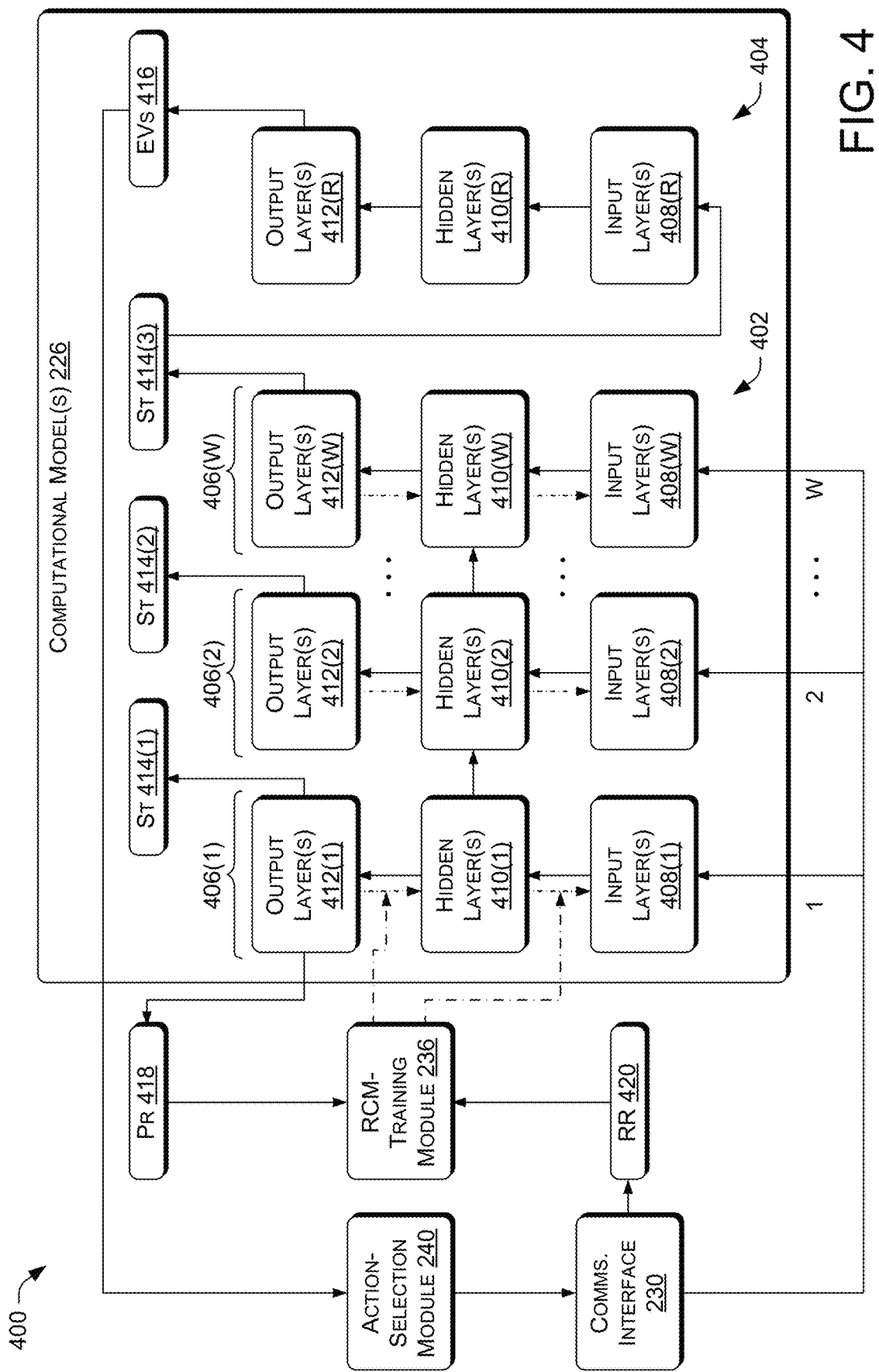
FIG. 4 is a block diagram depicting training and operation of computational models using neural networks according to various examples described herein.

FIG. 4 is a dataflow diagram 400 illustrating an example implementation of training and/or operation of computational models 226 using neural networks. In the illustrated example, the computational models 226 include an RNN 402, which is an example of an RCM, and a DQN 404, which is an example of an NCM. The RNN 402 is shown with W time steps 406(1)-406(W) (individually and/or collectively referred to herein with reference 406) unfolded. In some examples, W is an integer greater than zero.

In the illustrated example, the RNN 402 (at each time step 406) includes respective sets 408(1)-408(W) of one or more input layers (individually and/or collectively referred to herein as "input layers" with reference 408). As shown, the RNN 402 also has respective sets 410(1)-410(W) of one or more hidden layers for the time steps (individually and/or collectively referred to herein as "hidden layers" with reference 410), and respective sets 412(1)-412(W) of one or more output layers for the time steps (individually and/or collectively referred to herein as "output layers" with reference 412). Similarly, the DQN 404 includes respective sets of input layers, denoted sets 408(R) for ease of reference, respective sets of hidden layers 410(R), and respective sets of output layers 412(R). The unfolded representation here does not require that multiple sets of, e.g., input layers 408 be present at any given time. For example, set 408(1) and set 408(2) can represent the same artificial neurons but with respective, different sets of parameters.

In some examples, one or more of the neural networks 402 and/or 404, and/or one or more of the layers and/or sets of layers 408, 410, and/or 412, can be combined into combination neural networks, layers, and/or sets of layers. As used herein, the term "neural network" encompasses connected, independently-operable subnetworks of a larger neural network. In some of the examples, the neural networks 402 and/or 404 have respective, different neuron parameters of the respective input layers 408; respective, different neuron parameters of the respective hidden layers 410; and/or respective, different neuron parameters of the respective output layers 412.

In the illustrated example, operating each of the plurality of neural networks 402 and/or 404 can include transforming corresponding input values according to respective, different input-specific parameters of the neural networks 402 and/or 404. In some examples, the input layer(s) 408 are configured to apply nonlinear transformation(s) to input data value, e.g., received by the reception module 246.

In the illustrated example, neuron parameters of the hidden layer(s) 410 of the corresponding neural networks 402 and/or 404 correspond to history parameters of the computational model 226. The hidden layers 410 and/or output layers 412 of the RNN 402 at one of the time steps 406 can use values from hidden layer(s) 410 of an earlier time step 406. This arrangement permits maintaining history in the computational model 226, so that output values of the computational model 226 can represent, e.g., complex relationships between inputs and outputs over multiple time periods. Also in the example shown, at least one of the respective output layer(s) 412 of at least one of the time steps 406 is connected to at least one of the respective hidden layer(s) 410. In the illustrated unrolled example, the hidden layers 410 are shown in a daisy-chain connection. However, other configurations are possible. For example, hidden layer 410(3) can use values from two time steps back, e.g., from not only hidden layer 410(2) but also hidden layer 410(1).

In the illustrated example, the RNN 402 can produce output(s) 414(1)-414(W) (individually and/or collectively referred to herein with reference 414) for respective time steps 406. In some examples, the output(s) 414 are and/or include state information (shown as "St") of the target feature, as discussed above with reference to the RCM-operation module 234, FIG. 3. For example, the outputs 414, denoted $y_t$, $t \in [1, W]$, can be determined as in Eqs. (1) and (2):

$$y_t = f(U \cdot h_t) \quad (1)$$

$$h_t = \sigma(W \cdot h_{t-1} + V \cdot x_t) \quad (2)$$

where σ represents activation function(s) of neurons in hidden layers 410, e.g., softmax, hyperbolic tangent, logistic, sigmoid, zero-clip, rectifier, softplus, and/or other functions. Also in Eqs. (1) and (2), $x_t$ represents, e.g., the inputs at time period t and/or value(s) produced by input layer 408(t), $h_t$ represents output(s) of hidden layer 410(t), V represents weighting factor(s) on the value(s) produced by input layers 408, U represents weighting factor(s) on the value(s) produced by hidden layers 410 and provided to output layers 412, and W represents weighting factor(s) on the value(s) produced by hidden layers 410 and provided to other hidden layers 410, e.g., later in a temporal sequence.

Similarly, the DQN 404 can produce output 416 indicating expectation values ("EVs") of actions that can be taken. The expectation values can be arranged in an expectation vector (denoted "$\mathbb{Q}$" or "$\vec{Q}$" herein). For example, the topmost of output layer(s) 412(R) can include one artificial neuron for each of a predetermined set of actions. Each artificial neuron can output an expectation value for a respective one of the actions. Each expectation value can indicate, e.g., the predicted long-term reward for taking the respective action. In some examples, action-selection module 240, can select the action with the highest expectation value (e.g., the highest-valued element of the expectation vector) at each time step in order to provide an improved long-term reward. In some examples, the selected action is provided via the communications interface 230, and an observation value is received via the communications interface 230 to be provided to the RNN 402 as input in the next time step.

As indicated by the dash-dot arrows, parameters of RNN 402 can be adjusted using backpropagation and/or other training algorithms for recursive neural networks. For example, a predicted result value 418 ("Pr") from output layers 412(1) can be compared to a reference result value 420 ("RR") received via communications interface 230. The parameters can be updated by RCM-training module 236 based on the result of the comparison. The RCM-training module 236 can, e.g., adjust parameters, e.g., neuron parameters, of hidden layer(s) 410 of RNN 402. The RCM-training module 236 can train the RNN 402 using a backpropagation training algorithm, e.g., in an SGD framework, with backpropagation provided within a time step 406 from output layer(s) 412 back to hidden layer(s) 410 and/or input layer(s) 408.

DQN 404 can be trained using a reinforcement-learning algorithm, e.g., Q learning, e.g., in an SGD framework. The NCM-training module 242 (omitted for brevity) can train DQN 404, e.g., based on the outputs of two different time steps 406, e.g., state information 414(1) and 414(2), and optionally further based on the reference result value 420. The NCM-training module 242 can train DQN 404 further based on the reference result value 418. This is discussed in more detail below with reference to FIG. 6. In some examples, each expectation value 416 output by DQN 404 can represent the combination of an expected reference result value 418 in response to a respective action with subsequent reference result values expected after taking that action. Therefore, expectation values 416 can represent the expected long-term result ("reward") of a particular short-term action. Training DQN 404 using reinforcement learning can cause DQN 404 to, with increasing accuracy as training proceeds, model those long-term results. This can permit selecting short-term actions based on long-term results in addition to and/or instead of short-term results. For example, in a robotic motion planner, choosing joint motions based at least in part on long-term results can permit moving more quickly and/or efficiently to a goal position, even if doing so requires individual joints to move the opposite direction they would move in a short-term-planning controller.

Figure 5:
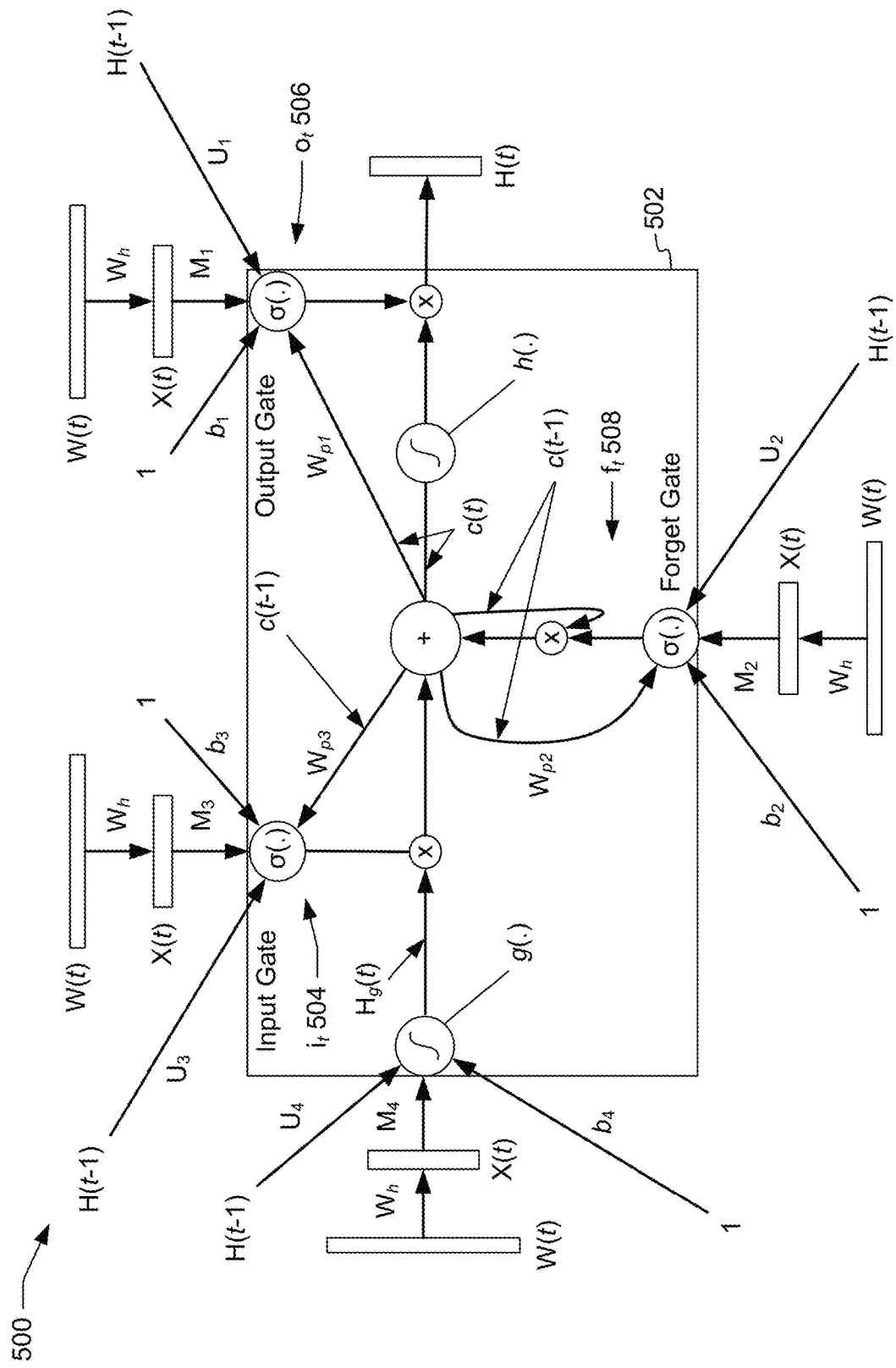
FIG. 5 is a dataflow diagram depicting an example architecture of a long short term memory cell that can be used in neural networks according to various examples described herein.

FIG. 5 is a dataflow diagram depicting an example architecture 500 of a long short term memory cell 502 that can be used in an RCM, e.g., RCMs 304 and/or 306, FIG. 3. In various examples, the LSTM cell in an RNN-LSTM model can be used to replace the activation function (e.g., non-linear activation function) of the RNN described above.

In some examples, the LSTM architecture 500 can comprise a cell 502, an input gate $i_t$ 504, an output gate $o_t$ 506, and a forget gate $f_t$ 508. As depicted in FIG. 5, the cell state of the LSTM cell 502 can be represented as vector $c_t$.

In various examples, the gates can be trained to selectively pick what the cell 502 should remember, via input gate $i_t$ 504, pass on via the output gate $o_t$ 506, and forget via the forget gate $f_t$ 508. In some examples, the input gate $i_t$ 504, the output gate $o_t$ 506, and the forget gate $f_t$ 508 can each be trained by a respective neural network (e.g., non-linear transformation). In various examples, the training may be facilitated by applying a stochastic gradient descent (SGD) algorithm, and/or by applying a different algorithm.

The input gate $i_t$ 504, the output gate $o_t$ 506, and the forget gate $f_t$ 508, may comprise respective parameters that are trained to give a desired result. In various examples, the input gate $i_t$ 504 parameter may evolve in such a way that it attenuates unimportant information from an input. In such examples, one or more of the input gate $i_t$ 504 parameter, the output gate $o_t$ 506 parameter, and the forget gate $f_t$ 508 parameter may reduce the effect of unimportant features in a representation H(t) of the input.

Additionally and/or alternatively, one or more of the input gate $i_t$ 504 parameter, the output gate $o_t$ 506 parameter, and the forget gate $f_t$ 508 parameter may be trained to detect and emphasize important information in the input. The parameters can be trained via supervised learning, e.g., as described below with reference to FIG. 6.

In various examples, the LSTM cell 502 may comprise peephole connections, depicted in FIG. 5 as $W_{p1}$, $W_{p2}$, and $W_{p3}$. In such examples, the LSTM cell 502 may comprise a connection to a current cell state $c_t$. Additionally, the LSTM cell 502 may comprise input connections $W_i$, recurrent connections $W_{rec_i}$, and bias values $b_i$ for i=1, 2, 3, 4.

The LSTM architecture 500 may apply functions g(•), h(•), and σ(•) to various vectors. In various examples, g(•) and h(•) may comprise tan h(•) functions, and σ(•) may comprise a sigmoid function.

As illustrated in FIG. 5, the forward pass for an LSTM-RNN model can be represented as in Eqs. (3)-(8):

$$H_g(t)=g(M_4 l_1(t)+U_4 H(t-1)+b_4) \quad (3)$$

$$i(t)=\sigma(M_3 X(t)+U_3 H(t-1)+W_{p3}c(t-1)+b_3) \quad (4)$$

$$f(t)=\sigma(M_2 X(t)+U_2 H(t-1)+W_{p2}c(t-1)+b_2) \quad (5)$$

$$c(t)=f(t)\circ c(t-1)+i(t)\circ H_g(t) \quad (6)$$

$$o(t)=\sigma(M_1 X(t)+U_1 H(t-1)+W_{p1}c(t)+b_1) \quad (7)$$

$$H(t)=o(t)\circ h(c(t)), \quad (8)$$

where (∘) denotes a Hadamard (element-wise) product.

Figure 6:
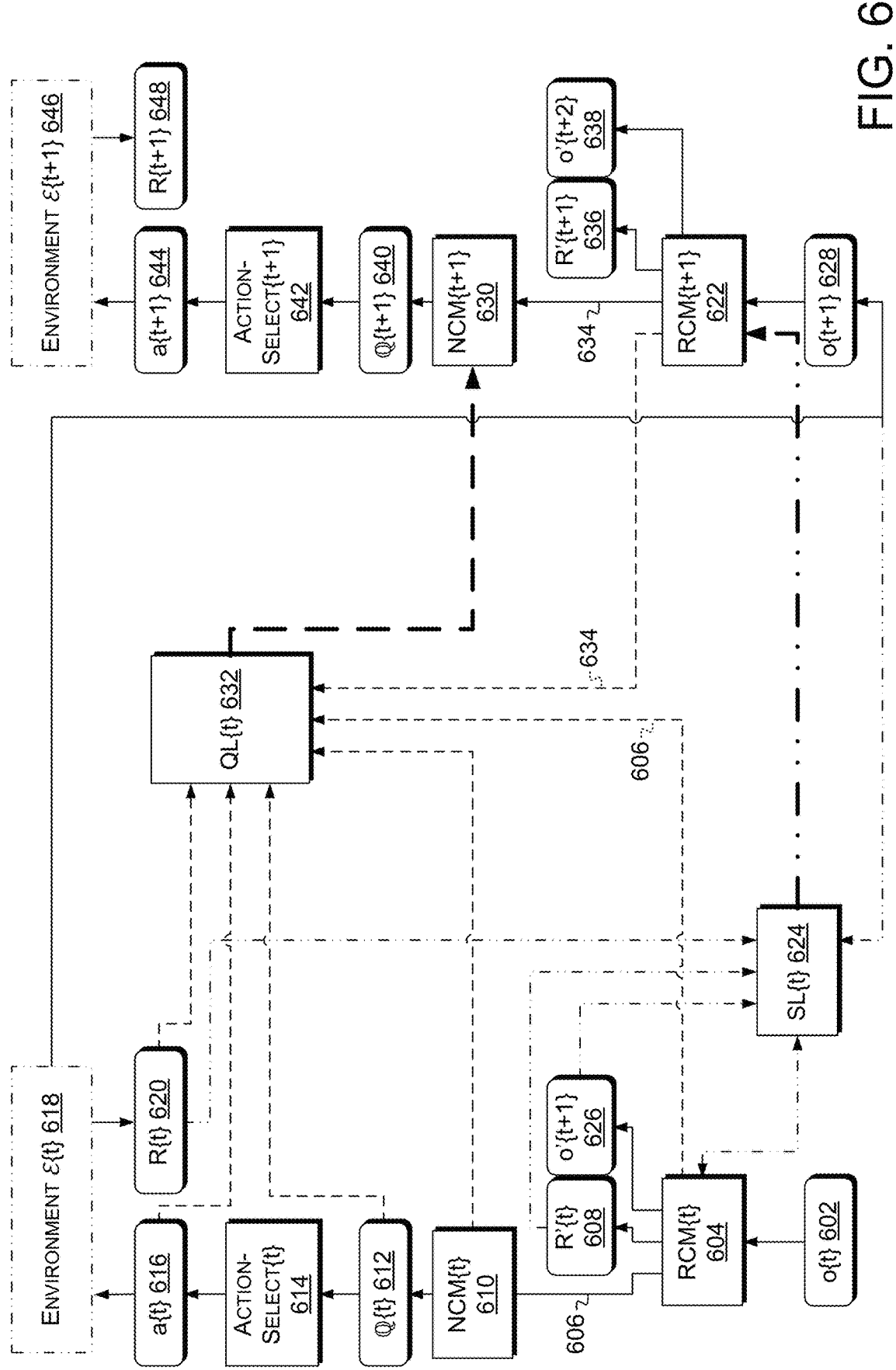
FIG. 6 is a dataflow diagram that illustrates example architectures for training a computational model according to various examples described herein.

FIG. 6 is a dataflow diagram 600 illustrating an example implementation of operation and training of multiple computational models, e.g., in a control system. In diagram 600, processing blocks and/or steps, such as the operation and/or application of computational models, are shown with rectangles, and data items are shown with rounded rectangles. The illustrated example computational models are configured for discrete-time operation. Accordingly, an environment, at various time steps, is shown in phantom and discussed below. However, continuous-time operation can also be performed. Two time steps are shown, denoted "{t}" and "{t+1}." A subscript time and a time in curly braces are used interchangeably herein; e.g., O{t}≡$O_t$. In FIG. 6, dash patterns of the connecting lines are used solely for clarity of exposition. Solid lines represent dataflow for operation of the computational models, dash-dot-dot lines represent dataflow for training of a recurrent computational model, and dashed lines represent dataflow for training of a network computational model. Heavy lines represent parameter updates. Note that, for clarity, some values are represented by multiple lines on the diagram. The illustrated dataflow is an example; other dataflows can be used as described herein.

In the illustrated example, a first observation value 602 (o{t}) is provided, e.g., by reception module 246. The first observation value 602 can be received via the communications interface 230. The first observation value 602 is provided to a first RCM 604 (RCM{t}), e.g., including one or more LSTM cells 502, FIG. 5, and/or one or more other recurrent structures described above. In the context of reinforcement learning, first observation value 602 can represent a state of the environment 110. In some examples, first observation value 602 can include a sensor reading from a sensor 302.

The first RCM 604 is operated to provide first state information 606 (referred to herein as h{t}) and a predicted result value 608 (R'{t}). The first state information 606 is provided to a first NCM 610. For example, the first RCM 604 can be operated based on the first observation value 602 to provide the first state information and the predicted result value.

The first NCM 610 is operated based at least in part on the first state information to provide an expectation vector 612 ($\mathbb{Q}$ {t}) including one or more, and/or a plurality of, expectation values. As noted above, the expectation values can correspond to respective actions of one or more, and/or a plurality of, actions. As used herein, square brackets are used for vector indexing. For example, the expectation value corresponding to action a at time t is denoted $\mathbb{Q}$ {t}[a] and/or (equivalently) $\mathbb{Q}_t$ [a].

In some examples, at least one action of the plurality of actions can be selected based at least in part on one or more of the expectation values. In some examples, an action-selection operation 614 can be performed on the expectation vector 612 to select a selected action 616 (a{t}) of the plurality of actions. In an example, the action-selection operation 614 can include selecting the action(s) corresponding to the highest (and/or n highest) expectation values in the expectation vector 612. This is discussed in more detail below with reference to Table 2.

An indication of at least one of the plurality of actions can then be provided via the communications interface 230. For example, an indication of the selected action 616 can then be provided using transmitting module 244.

Via the communications interface 230 and, e.g., an actuator 312, the selected action can take effect on a first environment 618 (∈{t}), e.g., a first state of an ongoing and/or continuously-existing environment. A sensor 302 can detect, and/or a result subsystem 314 can provide, a result value, in this example a reference result value 620 (R{t}). In the context of reinforcement learning, the result value can represent a reward value. The reference result value 620 can be received via the communications interface 230.

The first RCM 604 can then be trained based at least in part on the predicted result value 608 and the reference result value 620 to provide a second RCM 622. This can be done, e.g., using a supervised-learning operation 624 such as SGD together with a backpropagation algorithm suitable for recurrent networks. In supervised-learning operation 624, updated neuron parameter values can be determined based at least in part on the existing neuron parameter values from first RCM 604, the predicted result value 608 (an estimated value), and the reference result value 620 (a supervision value). The parameters of the second RCM 622 can be determined to reduce differences between the predicted result value 608 and the reference result value 620.

In some examples, the first RCM 604 can be operated to further provide a predicted observation value 626 (o'{t+1}). A second observation value 628 (o{t+1}), which can be an example of a reference observation value, can be received via the communications interface 230. For example, the second observation value 628 can be received after providing the indication of the selected action 616. The first RCM 604 can then be trained further based on the predicted observation value 626 and the second observation value 628 to provide the second RCM 622.

After operating the first NCM 610 and determining the expectation vector 612, the first NCM 610 can be trained. The first NCM 610 can be trained based at least in part on the first state information 606 and the at least one of the plurality of actions, e.g., the selected action 616, to provide a second NCM 630. The training can be performed by a reinforcement-learning operation 632, e.g., a Q-learning update rule.

In some examples, the second RCM 622 can be operated to provide second state information 634 (referred to herein as h{t+1}). The first NCM 610 can then be trained further based on the second state information 634. For example, the Bellman equation and/or its equivalent in a Q-learning framework can be used, as discussed below with reference to Table 2 and Eq. (10).

The above-described operations illustrated in FIG. 6 can be repeated one or more times. For example, second RCM 622 can be operated to further provide a second predicted result value 636 and/or a second predicted observation value 638, which can then be used in training a third RCM (omitted for brevity). The second NCM 630 can be operated to determine a second expectation vector 640 ($\mathbb{Q}$ {t+1}). A second action-selection operation 642 can be performed to select a second action 644 (a{t+1}). The second selected action 644 can affect a second environment 646 ($\in${t+1}), e.g., the environment 110 at a later time, e.g., via an actuator 312. A sensor 302 can detect, and/or a result subsystem 314 can provide, a second reference result value 648 (R{t+1}).

In some examples, training and operation are performed as listed in Table 2. In Table 2, N(I|S) represents the application of network N with parameters S to input I. $\mathbb{Q}_t$ denotes an expectation vector at time t. $\mathbb{Q}_{s,\theta}$ denotes an expectation vector as in Eq. (9):

$$\mathbb{Q}_{s,\theta} = DQN(s|\theta) = Q(s,a;\theta) \tag{9}$$

SL(•) is a supervised-learning update rule. QL(•) is a Q-learning update rule, e.g., Eq. (10):

$$QL(\theta, s, a, r, s') = \theta + \eta \left( r + \gamma \left[ \operatorname*{argmax}_{a'} \mathbb{Q}_{s',\theta}[a'] \right] - \mathbb{Q}_{s,\theta}[a] \right) \nabla_\theta \mathbb{Q}_{s,\theta} \tag{10}$$

where θ are network parameters, s is a state, a is an action taken in that state, r is a result value after that action, and s' is a new state after taking action a.

TABLE 2

| 1 | Initialize RCM parameters $\phi_1$ and NCM parameters $\theta_1$. |
| --- | --- |
| 2 | $h_1, R_1', o_2' \leftarrow RCM(o_1 \mid \phi_1)$ |
| 3 | $\mathbb{Q}_1 \leftarrow NCM(h_1 \mid \theta_1)$ |

TABLE 2-continued

| 4 | $a_1 = \arg\max_{a'} \mathbb{Q}_1[a']$ |
| --- | --- |
| 5 | Perform $a_1$ |
| 6 | Receive $R_1, o_2$ from environment $\varepsilon_1$ |
| 7 | for each t ∈ [2, 3, ... ]: |
| 8 | $\phi_t \leftarrow SL(\phi_{t-1}, R_{t-1}', R_{t-1}, o_t', o_t)$ |
| 9 | $h_t, R_t', o_{t+1}' \leftarrow RCM(o_t \mid \phi_t)$ |
| 10 | $\theta_t \leftarrow QL(\theta_{t-1}, h_{t-1}, a_{t-1}, R_{t-1}, h_t)$ (Eq. (10)) |
| 11 | $\mathbb{Q}_t \leftarrow NCM(h_t \mid \theta_t)$ |
| 12 | $a_t = \arg\max_{a'} \mathbb{Q}_t[a']$ |
| 13 | Perform $a_t$ |
| 14 | Receive $R_t, o_{t+1}$ from environment $\varepsilon_t$ |
| 15 | next t |

In Table 2, line 2 corresponds to operating first RCM 604 to determine first state value 606 ($h_t$=h{t}), predicted result value 608, and predicted observation value 626. Line 3 corresponds to operating first NCM 610. For example, first NCM 610 can be a Q-learning network configured to compute the result of a "Q function" that provides an expectation vector $\mathbb{Q}$. Line 4 corresponds to selecting an action and is an example of action-selection operation 614. Line 5 corresponds to, e.g., transmitting selected action 616 to actuator 312 to affect first environment 618. Line 6 corresponds to, e.g., receiving first (reference) result value 620 from, e.g., sensor 302.

In Table 2, lines 8-14 are a loop that can be run zero and/or more times. Line 8 corresponds to training the first RCM 604 using the supervised-learning operation 624 to provide the second RCM 622. Line 9 corresponds to operating the second RCM 622. Line 10 corresponds to training the first NCM 610 using the reinforcement-learning operation 632 (e.g., Eq. (10)) to provide the second NCM 630. Lines 11-14 correspond to lines 3-6, respectively, but using the second NCM 630 to determine the second expectation vector 640 and the second selected action 644, provide the second selected action 644 to the second environment 646, and receive the second reference result value 648.

In some examples, the algorithm in Table 2 is performed online. For example, the steps can be performed for each individual action and result. In some examples, the algorithm in Table 2 is performed offline. For example, actions, results, and observations can be recorded in minibatches in training data 228. Training can then be performed offline using one or more minibatches, e.g., a plurality of minibatches.

In some examples, the algorithm in Table 2 is performed partially offline. For example, during operation of the first RCM 604 and the first NCM 610, the batching module 248 can store a selected number (e.g., 100) of sets of training data 228, e.g., the s, a, r, and s' parameters to Eq. (10) and/or the R, R', o, and o' parameters to function SL(•) in Table 2, line 8. Once the selected number of sets has been stored, the training operations 624 and 632 can be carried out using the stored training data 228 to determine the second RCM 622 and the second NCM 630. Training can be performed in a stochastic manner, e.g., by selecting minibatches at random from training data 228

In a minibatch and/or other offline and/or partially offline training configuration, the loop structure shown in Table 2 can be rearranged. For example, instead of the main loop delimited by lines 7 and 15, individual ones of, e.g., lines 2, 3, 4, 8, 9, 10, 11, and/or 12 can be performed multiple times, e.g., before subsequent line(s) are performed, and/or in parallel with performance of subsequent line(s). For example, in line 2, the RCM can be operated multiple times to determine multiple outputs, as in Eq. (11):

$$\vec{h}, \vec{R'}, \vec{o'} \leftarrow \text{RCM}(\vec{o} | \phi_1) \tag{11}$$

where input $\phi_1$ is a set of parameters of the RCM (e.g., 604), input $\vec{o}$ is a vector of observation values (e.g., 602, 628), e.g., corresponding to respective, different times t, output $\vec{h}$ is a vector of respective state values (e.g., 606, 634), output $\vec{R'}$ is a vector of predicted result values (e.g., 608, 636), and output $\vec{o'}$ is a vector of predicted observation values (e.g., 626, 638).

Continuing this example, respective expectation vectors can be determined for multiple samples as in Eq. (12):

$$\mathbb{Q}\{t\} \leftarrow \text{NCM}(\vec{h}\{t\} | \theta_1) \tag{12}$$

where input $\theta_1$ is a set of parameters of the NCM (e.g., 610), $\vec{h}\{t\}$ is the $t^{th}$ element of the vector $\vec{h}$ of respective state values from Eq. (11), and $\mathbb{Q}\{t\}$ is the $t^{th}$ expectation vector.

In some examples, training can also be performed in a vectorized and/or minibatch manner, and/or a stochastic manner. For example, Table 2, line 8 can be expressed using minibatch gradient descent for a batch having E samples as in Eq. (13):

$$\phi_{new} \leftarrow \phi_{old} - \eta \sum_{e=1}^{E} \nabla C(R'_{e-1}, R_{e-1}, o'_e, o_e) \tag{13}$$

where C(•) is the cost function to be minimized. Alternatively, line 8 can be expressed using stochastic gradient descent for a particular, randomly-selected example e as in Eq. (14):

$$\phi_{new} \leftarrow \phi_{old} - \eta \nabla C(R'_{e-1}, R_{e-1}, o'_e, o_e) \tag{14}$$

Similarly, training of the NCM, e.g., line 10, can be operated in a minibatch and/or stochastic configuration. Operating in batch, e.g., as in Eqs. (11)-(14), can improve processing speed and/or stability of the training process. Using stochastic techniques, e.g., as in Eq. (14), can provide improved speed of convergence and/or improved numerical stability of the training process.

In some examples, of minibatch, online, offline, and/or any other training, a method can include alternating training steps of a recurrent neural network and a Q network, e.g., alternating training operations 624 and 632. As discussed above, an output of the recurrent neural network (e.g., state information 606) can be a training input of the Q network, e.g., an input to reinforcement-learning operation 632. A result value (e.g., first result value 620) corresponding to an output of the Q network (e.g., selected action 616 computed from the expectation vector 612 output by the first NCM 610) can be a training input of the recurrent neural network, e.g., an input to supervised-learning operation 624. As described herein, the output of the Q network can be, e.g., an action of a plurality of actions having a highest expectation value. The output of the Q network can be provided via a communications interface, e.g., as discussed above with reference to transmission module 244 or communications module 230. The input of the recurrent neural network can be, e.g., a sensor reading or other value received via a communications interface, e.g., as described herein with reference to communications module 230 or RCM-operation module 234.

Illustrative Processes

Figure 7:
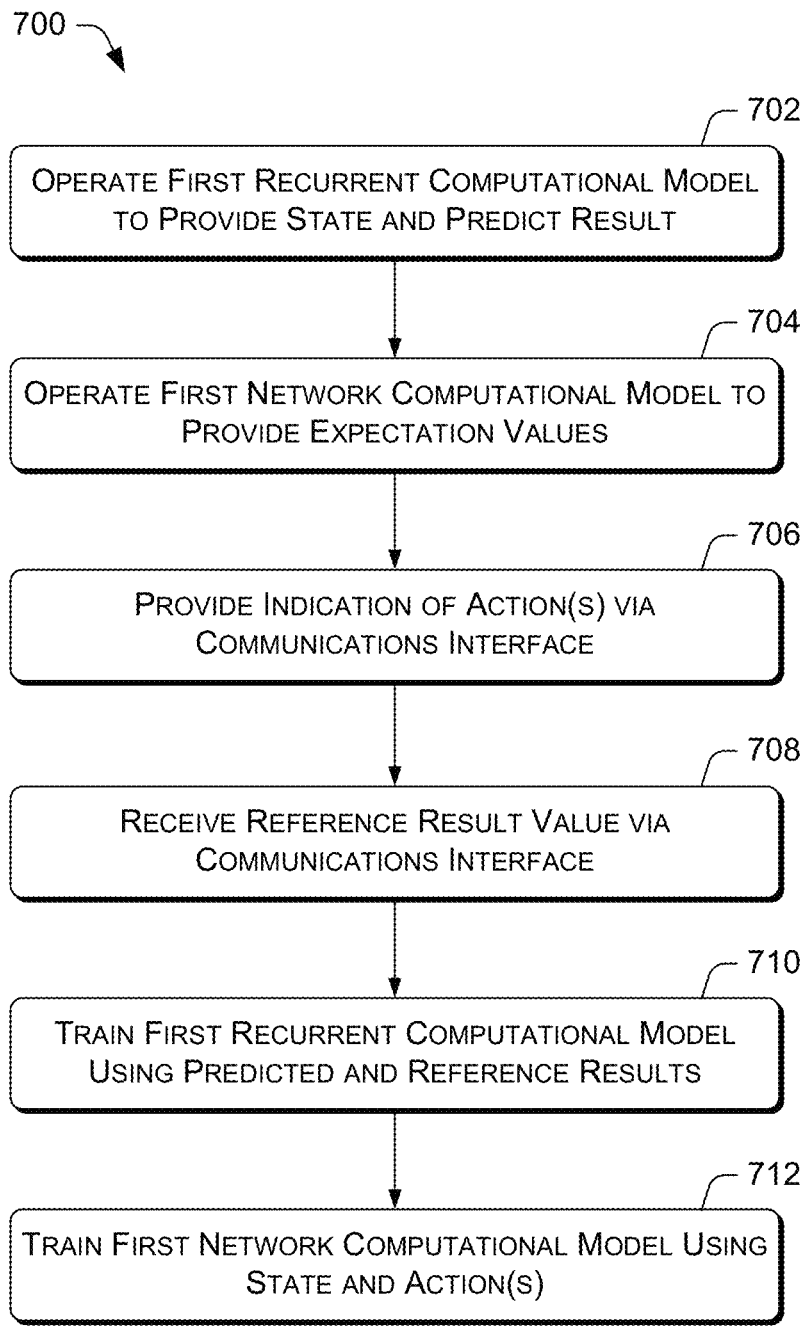
FIG. 7 is a flow diagram that illustrates example processes for training computational models according to various examples described herein.

FIG. 7 is a flow diagram that illustrates an example process 700 for training computational model(s). Example functions shown in FIG. 7 and other flow diagrams and example processes herein can be implemented on and/or otherwise embodied in one or more computing device(s) 102 and/or 104, e.g., a computing device 200, e.g., using software running on such device(s). For the sake of illustration, the example process 700 is described below with reference to processing unit 216 and other components of computing device 200, FIG. 2, that can carry out and/or participate in the steps of the exemplary method. However, other processing unit(s) such as processing unit 114 and/or other components of computing device(s) 102 and/or 104 can carry out step(s) of described example processes such as process 700. Similarly, exemplary method(s) shown in FIGS. 7-11 are also not limited to being carried out by any specifically-identified components.

The order in which the operations are described in each example flow diagram and/or process is not intended to be construed as a limitation, and any number of the described operations can be combined in any order and/or in parallel to implement each process. Moreover, the operations in each of FIGS. 7-11 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

In some examples, at block 702, a first recurrent computational model (RCM) can be operated to provide first state information and a predicted result value. This can be done, e.g., as described above with reference to Table 2, line 2.

In some examples, at block 704, a first network computational model (NCM) can be operated to provide respective expectation values of one or more actions, e.g., a plurality of actions, based at least in part on the first state information. This can be done, e.g., as described above with reference to Table 2, line 3.

In some examples, at block 706, an indication of at least one of the plurality of actions is provided via a communications interface 230. For example, data of the indication can be transmitted, e.g., in an Internet Protocol (IP) packet connection and/or via an RS-232 link. In some examples, data of the indication can be stored to a computer-readable medium, e.g., RAM and/or a disk, via a memory and/or disk interface in communications interface 230. This can be done, e.g., as described above with reference to Table 2, line 5.

In some examples, at block 708, a reference result value can be received via the communications interface 230. This can be done, e.g., as described above with reference to Table 2, line 6. For example, data of the reference result value can be received via a network and/or serial link, and/or data of the reference result value can be retrieved from a computer-readable medium.

In some examples, at block 710, the first RCM can be trained based at least in part on the predicted result value and the reference result value to provide a second RCM. This can be done, e.g., as described above with reference to Table 2, line 8 (SL(•)).

In some examples, at block 712, the first NCM can be trained based at least in part on the first state information and the at least one of the plurality of actions to provide a second NCM. This can be done, e.g., as described above with reference to Table 2, line 10.

Figure 8:
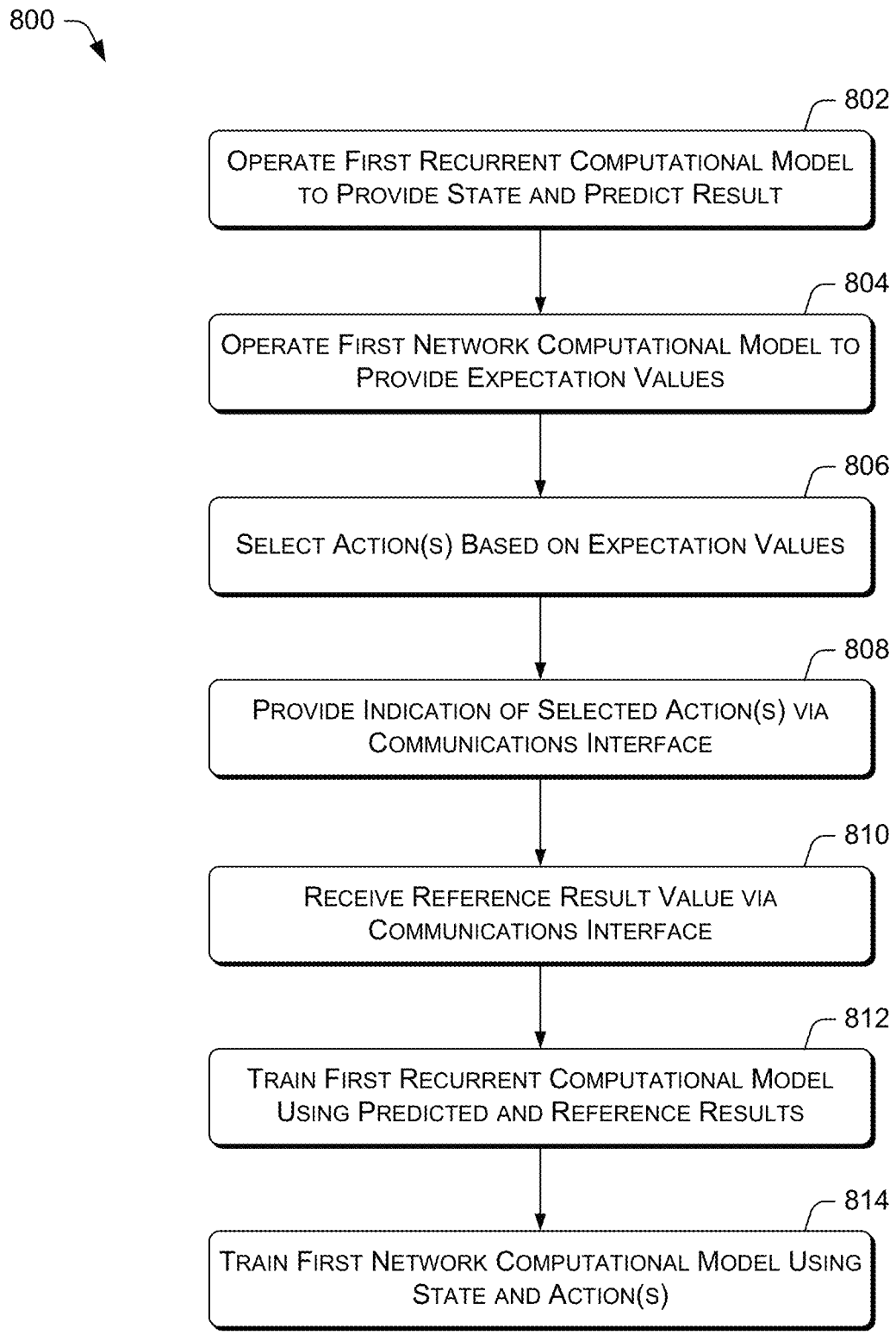
FIG. 8 is a flow diagram that illustrates example processes for training and operating computational models and selecting actions according to various examples described herein.

FIG. 8 is a flow diagram that illustrates an example process 800 for training and operating computational model(s).

In some examples, at block 802, a first recurrent computational model (RCM) can be operated to provide first state information and a predicted result value. This can be done, e.g., as described above with reference to Table 2, line 2.

In some examples, at block 804, a first network computational model (NCM) can be operated to provide respective expectation values of one or more actions, e.g., a plurality of actions, based at least in part on the first state information. This can be done, e.g., as described above with reference to Table 2, line 3.

In some examples, at block 806, at least one action is selected from the plurality of actions based at least in part on one or more of the expectation values. This can be done, e.g., as described above with reference to Table 2, lines 4 and/or 12.

In some examples, at block 808, an indication of the selected action(s) is provided via the communications interface 230. This can be done, e.g., as described above with reference to block 706.

In some examples, at block 810, a reference result value can be received via the communications interface 230. This can be done, e.g., as described above with reference to Table 2, line 6. For example, data of the reference result value can be received via a network and/or serial link, and/or data of the reference result value can be retrieved from a computer-readable medium.

In some examples, at block 812, the first RCM can be trained based at least in part on the predicted result value and the reference result value to provide a second RCM. This can be done, e.g., as described above with reference to Table 2, line 8 (SL(•)).

In some examples, at block 814, the first NCM can be trained based at least in part on the first state information and the at least one of the plurality of actions to provide a second NCM. This can be done, e.g., as described above with reference to Table 2, line 10.

Figure 9:
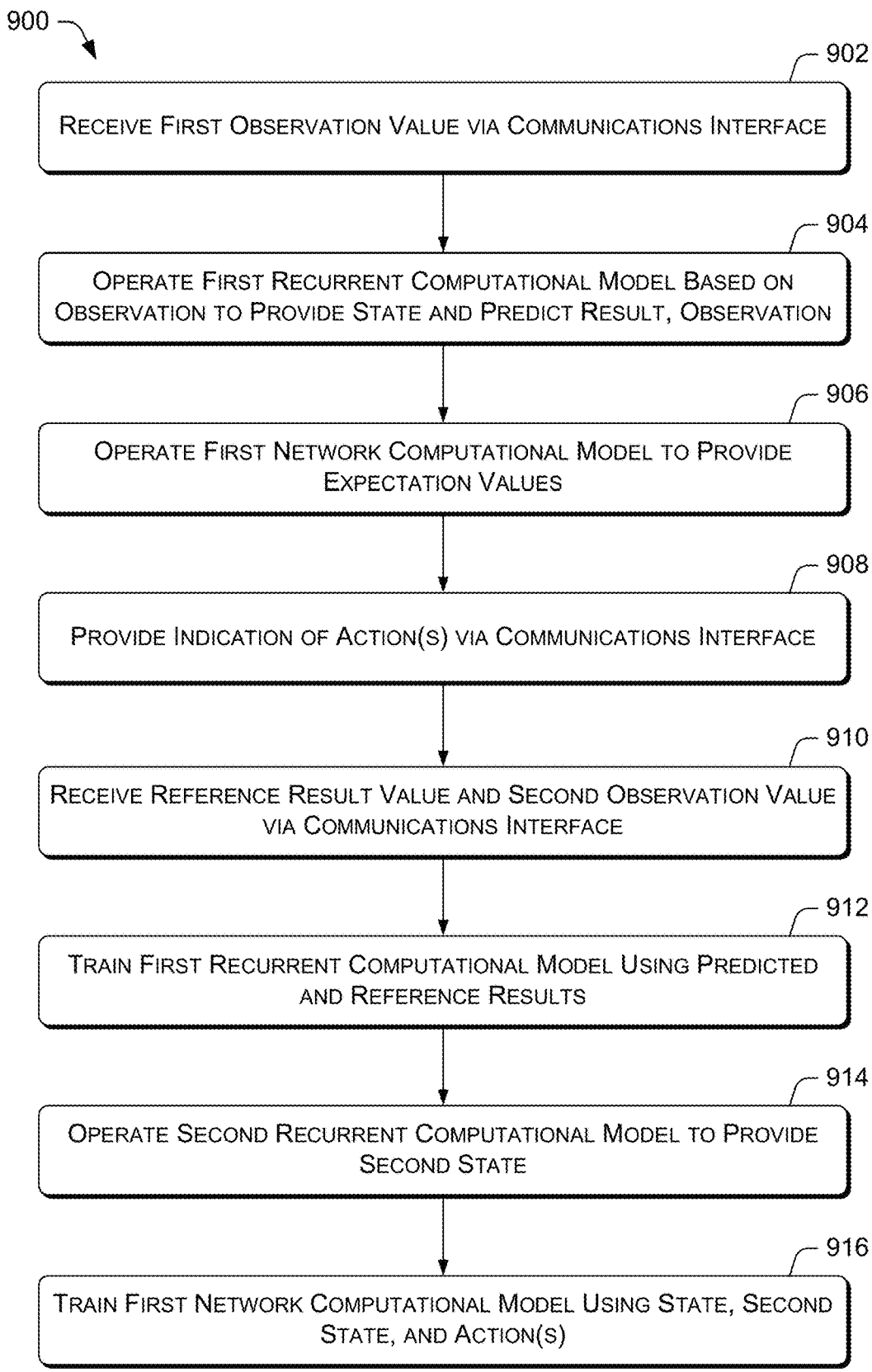
FIG. 9 is a flow diagram that illustrates example processes for training and operating computational models according to various examples described herein.

FIG. 9 is a flow diagram that illustrates an example process 900 for training and operating computational model(s).

In some examples, at block 902, a first observation value can be received via the communications interface 230. This can be done, e.g., as described above with reference to first observation value 602. In some examples, the first observation value can include a sensor reading.

In some examples, at block 904, the first RCM can be operated further based on the first observation value to provide the first state information and the predicted result value. This can be done, e.g., as described above with reference to Table 2, lines 2 and/or 9.

In some examples, at block 904, the first RCM can be operated to further provide a predicted observation value. This can be done, e.g., as described above with reference to Table 2, lines 2 and/or 9.

In some examples, at block 906, a first network computational model (NCM) can be operated to provide respective expectation values of one or more actions, e.g., a plurality of actions, based at least in part on the first state information. This can be done, e.g., as described above with reference to Table 2, line 3.

In some examples, at block 908, an indication of at least one of the plurality of actions is provided via a communications interface 230. For example, data of the indication can be transmitted, e.g., in an Internet Protocol (IP) packet and/or via an RS 232 link. In some examples, data of the indication can be stored to a computer-readable medium, e.g., RAM and/or a disk, via a memory and/or disk interface in communications interface 230. This can be done, e.g., as described above with reference to Table 2, line 5.

In some examples, at block 910, a second observation value can be further received via the communications interface, in addition to the reference result value discussed with reference to block 708. This can be done, e.g., as discussed above with reference to second observation value 628, FIG. 6. In some examples, the receiving the second observation value can be performed after the providing the indication at block 706.

In some examples, at block 912, the first RCM can be trained based on the predicted result value and the reference result value, as in block 710, and further based on the predicted observation value and the second observation value, to provide the second RCM. This can be done, e.g., as described above with reference to Table 2, line 8. Block 912 can be followed by block 712, block 914, and/or block 916.

In some examples, at block 914, the second RCM can be operated to provide second state information. This can be done, e.g., as discussed above with reference to Table 2, lines 9 and 10.

In some examples, at block 916, the first NCM can be trained based on the state information and actions as discussed above with reference to block 712, and further based on the second state information from block 914.

Figure 10:
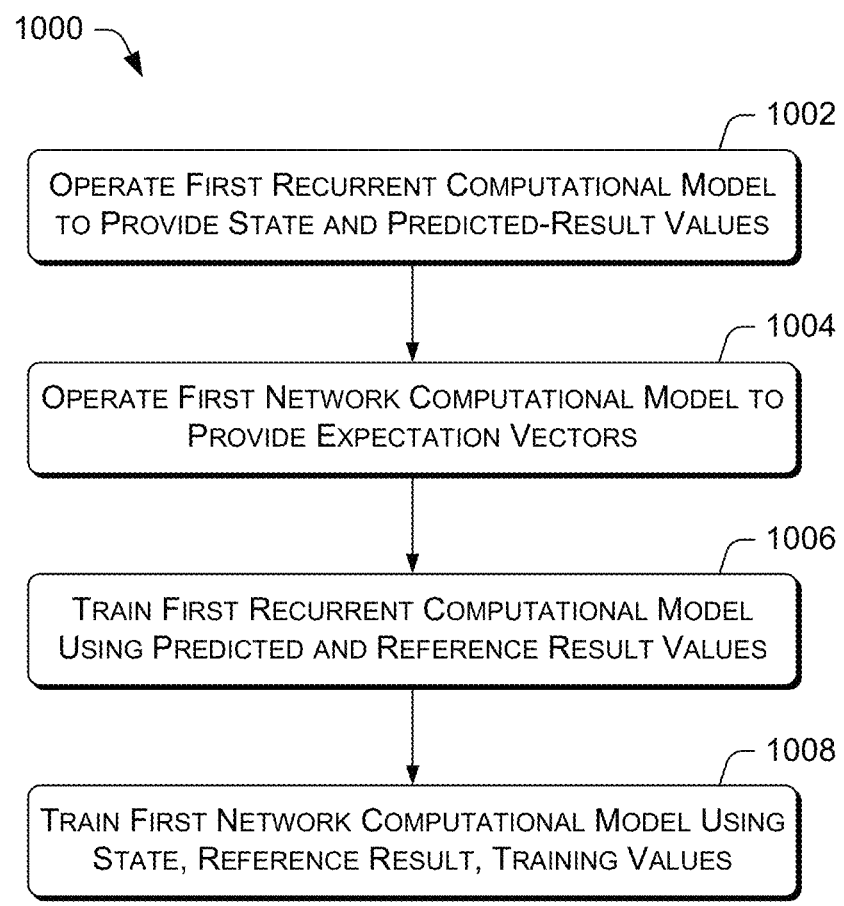
FIG. 10 is a flow diagram that illustrates example processes for training computational models, e.g., using batched and/or minibatch-based training data, according to various examples described herein.

FIG. 10 is a flow diagram that illustrates an example process 1000 for training computational model(s). Some examples use process 1000 in minibatch-based training techniques. Examples of minibatch-based training are described above with reference to Table 2. In some examples, a computer-readable medium 218 has thereon computer-executable instructions. The computer-executable instructions, upon execution, configure a computer to perform operations such as those described below.

In some examples, at block 1002, a first recurrent computational model (RCM) is operated based at least in part on individual ones of a plurality of values of training data to provide respective state values and respective predicted result values. For example, the first RCM can be operated to provide state information $h\{t\}$, $t \in [1, 2, \ldots, 100]$. This can be done, e.g., as described above with reference to Table 2, lines 2 and 9, and/or first state information 606 and predicted result value 608, FIG. 6. In some examples, one or more of the plurality of values of the training data can comprise respective sensor readings, e.g., as described above, or other observation values ($o\{t\}$) such as observation values 602 and/or 628, FIG. 6. An individual value of training data may comprise multiple data items, e.g., packaged into a record or tuple.

In some examples, at block 1004, a first network computational model (NCM) can be operated based at least in part the state values to provide respective expectation vectors. Each expectation vector can include one or more expectation values corresponding to respective actions. For example, the first NCM can be operated to provide expectation vectors $Q\{t\}$, $t \in [1, 2, \ldots, 100]$.

In the examples described herein, including examples described with reference to FIGS. 1-9 and 11, unless otherwise specified, individual items, e.g., physical items or data items, can be provided or operated on by any combination of the described operations. For example, block 1004 can be performed with respect to all of the state values provided by block 1002, or with respect to fewer than all of the state values provided by block 1002. Similarly, any operation described herein can produce data not consumed by a subsequent operation.

In some examples, block 1004 can further include operating the first RCM to further provide respective predicted training-data values. This can be done, e.g., as described above with reference to Table 2, lines 2 and 9, and/or predicted observation value 626, FIG. 6.

In some examples, at block 1006, the first RCM can be trained based at least in part on the predicted result values and respective reference result values (e.g., R{t}) to provide a second RCM. This can be done, e.g., as described above with reference to Table 2, line 8, and/or supervised-learning operation 624, FIG. 6.

In some examples, block 1006 can further include training the first RCM further based on the respective predicted training-data values and the respective subsequent ones of the plurality of values of the training data to provide the second RCM. This can be done, e.g., as described above with reference to Table 2, line 8, and/or supervised-learning operation 624, predicted observation value 626, and/or second observation value 628, FIG. 6.

In some examples, at block 1008, the first NCM can be trained based at least in part on the state values, respective subsequent ones of the plurality of values of training data (o{t+1}) and the respective reference result values (R{t}) to provide a second NCM. In some examples, the training of the first NCM involves computing h{t+1} from o{t+1} using the first RCM and/or the second RCM, and training the NCM using h{t+1} values. Block 1008 can be followed by block 1002.

Figure 11:
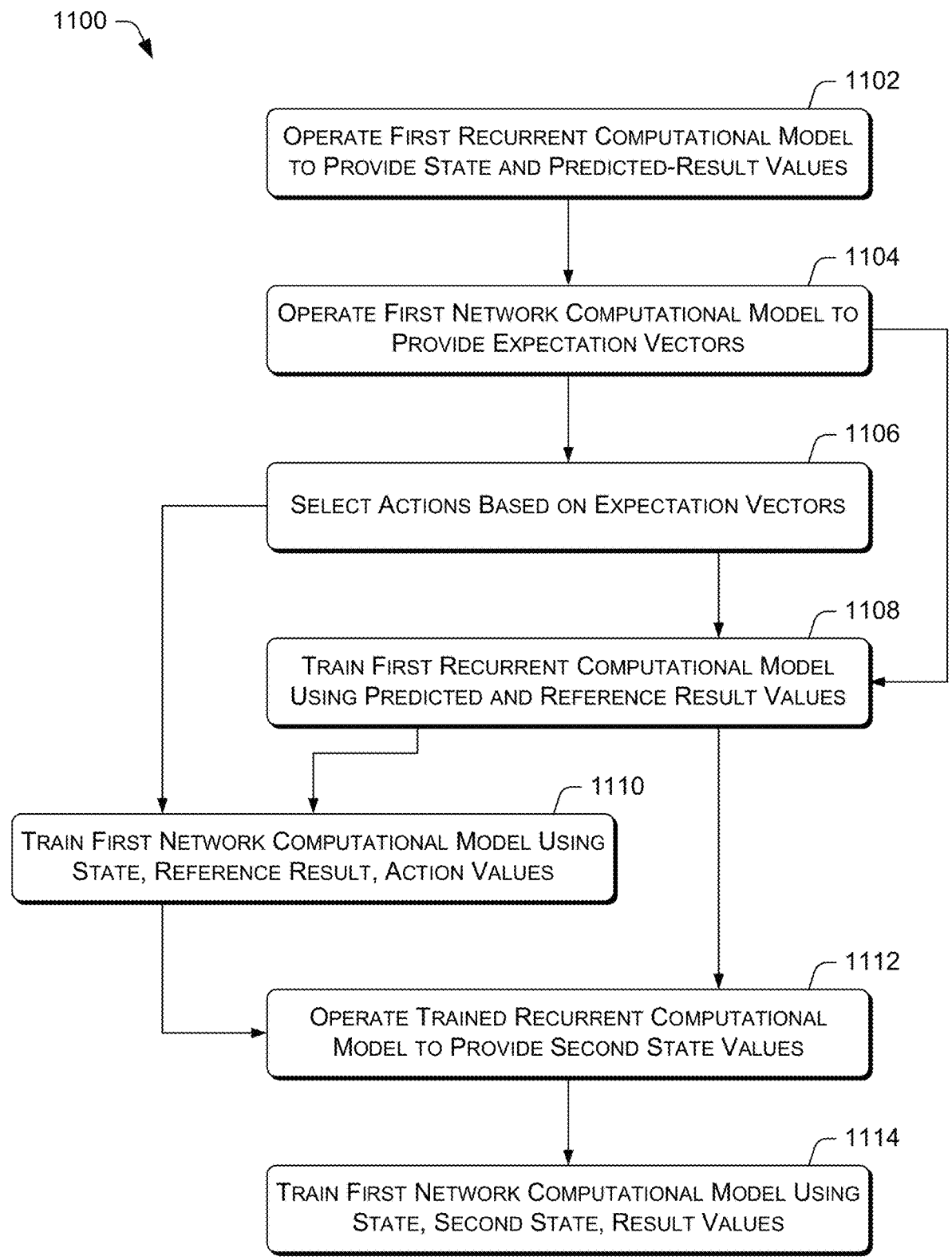
FIG. 11 is a flow diagram that illustrates example processes for training computational models, e.g., using batched and/or minibatch-based training data, and selecting actions according to various examples described herein.

FIG. 11 is a flow diagram that illustrates example processes 1100 for training computational model(s).

In some examples, at block 1102, a first recurrent computational model (RCM) is operated based at least in part on individual ones of a plurality of values of training data to provide respective state values and respective predicted result values. This can be done, e.g., as discussed above with reference to block 1002.

In some examples, at block 1104, a first network computational model (NCM) can be operated based at least in part the state values to provide respective expectation vectors. This can be done, e.g., as discussed above with reference to block 1004.

In some examples, at block 1106, respective actions are selected for individual ones of the plurality of values of the training data based at least in part on the respective expectation vectors. This can be done, e.g., as described above with reference to Table 2, lines 4 and/or 12, and/or action-selection operations 614 and/or 642. Block 1106 can be followed by block 1108 and/or block 1110.

In some examples, at block 1108, the first RCM can be trained based at least in part on the predicted result values and respective reference result values (e.g., R{t}) to provide a second RCM. This can be done, e.g., as described above with reference to block 1006. Block 1108 can be followed by block 1110 and/or 1112.

In some examples, at block 1110, the first NCM can be trained as described above with reference to block 1008, and further based on the selected respective actions, to provide the second RCM. This can be done, e.g., as described above with reference to Table 2, line 10.

At block 1112, the trained second RCM can be operated based at least in part on the subsequent ones of the plurality of values of the training data to provide respective second state values. This can be done, e.g., as described above with reference to Table 2, line 9, and/or second state information 634, FIG. 6.

At block 1114, the first NCM can be trained as described above with reference to block 1008, and further based on the respective second state values from block 1112, to provide the second RCM. This can be done, e.g., as described above with reference to Table 2, line 10, and/or reinforcement-learning operation 632, FIG. 6.

Illustrative Results

A simulation was performed of a CRM task using the 1998 KDD Cup dataset of direct-mailing interactions with customers. Rewards are therefore expressed in dollars. A simulator was constructed to provide variations based on the dataset for testing. Training data were extracted from the dataset and actions for the training data selected at random according to the probabilities with which those actions were present in the dataset. At least five runs were performed for each experimental configuration and the results averaged. Table 3 presents results for various computational models and/or combinations thereof, tested for 100,000 timesteps. The last two rows correspond to various examples herein.

TABLE 3

| Model(s) | Explanation | Reward |
|---|---|---|
| *Models trained via supervised learning* | | |
| DNN | A single deep neural network | $8.08 |
| RNN | A single recurrent neural network | $9.05 |
| LSTM | A single neural network including an LSTM unit | $9.06 |
| *Models trained via reinforcement learning* | | |
| DQN | A single Q network, with actions selected according to the highest Q value | $9.22 |
| RL-RNN | A single recurrent neural network | $9.39 |
| RL-LSTM | A single neural network including an LSTM unit | $9.35 |
| *Multi-model systems trained via both supervised and reinforcement learning* | | |
| SL-RNN + RL-DQN | A recurrent neural network trained with supervised learning, and a Q network trained with reinforcement learning | $9.69 |
| SL-LSTM + RL-DQN | A neural network, including an LSTM unit, trained with supervised learning, and a Q network trained with reinforcement learning | $9.67 |

As shown in Table 3, the SL-RNN+RL-DQN and SL-LSTM+RL-DQN examples as described herein, e.g., with reference to FIG. 6, provided a higher return than the other tested examples.

Example Clauses

A: A system, comprising: a communications interface; one or more processing unit(s) adapted to execute modules; and one or more computer-readable media having thereon a plurality of modules, the plurality of modules comprising: a module of a representation engine that is configured to: operate a first recurrent computational model (RCM) to provide first state information and a predicted result value; and train the first RCM based at least in part on the predicted result value and a corresponding reference result value to provide a second RCM; a module of an action engine that is configured to: operate a first network computational model (NCM) to provide respective expectation values of a plurality of actions based at least in part on the first state information; select an action of the plurality of actions based at least in part on one or more of the expectation values; and train the first NCM based at least in part on the first state information and the selected action to provide a second NCM; and a module of a communications engine that is configured to: provide an indication of the selected action via the communications interface; and receive the reference result value via the communications interface.

B: A system as recited in paragraph A, wherein: the representation engine is further configured to operate the second RCM to provide second state information; and the action engine is configured to train the first NCM further based on the second state information.

C: A system as recited in paragraph A or B, wherein at least the first RCM or the second RCM comprises a recurrent neural network and the representation engine is configured to train the first RCM using a supervised-learning update rule.

D: A system as recited in any of paragraphs A-C, wherein at least the first NCM or the second NCM comprises a neural network and the action engine is configured to train the first NCM using a reinforcement-learning update rule.

E: A system as recited in any of paragraphs A-D, wherein the action engine is configured to select the action of the plurality of actions corresponding to a highest expectation value of the one or more of the expectation values.

F: A system as recited in any of paragraphs A-E, wherein: the representation engine is further configured to operate the first RCM to provide a predicted observation value and to train the first RCM further based on the predicted observation value and a reference observation value; and the communications engine is further configured to receive the reference observation value.

G: A system as recited in paragraph F, further comprising a sensor coupled to the communications interface and configured to provide the reference observation value.

H: A system as recited in any of paragraphs A-G, further comprising an actuator coupled to the communications interface and responsive to the indication of the selected action to perform the selected action.

I: A system as recited in any of paragraphs A-H, further comprising a result subsystem coupled to the communications interface and configured to provide the reference result value.

J: A system as recited in any of paragraphs A-I, wherein individual ones of the expectation values indicate, represent, or correspond to the expected long term value of or resulting from taking the respective actions.

K: A system as recited in any of paragraphs A-J, wherein the expectation values comprise expectation long-term values.

L: A method, comprising: operating a first recurrent computational model (RCM) to provide first state information and a predicted result value; operating a first network computational model (NCM) to provide respective expectation values of a plurality of actions based at least in part on the first state information; providing an indication of at least one of the plurality of actions via a communications interface; receiving a reference result value via the communications interface; training the first RCM based at least in part on the predicted result value and the reference result value to provide a second RCM; and training the first NCM based at least in part on the first state information and the at least one of the plurality of actions to provide a second NCM.

M: A method as recited in paragraph L, further comprising: receiving a first observation value via the communications interface; and operating the first RCM further based on the first observation value to provide the first state information and the predicted result value.

N: A method as recited in paragraph M, wherein the first observation value comprises a sensor reading.

O: A method as recited in paragraph M or N, further comprising: operating the first RCM to further provide a predicted observation value; receiving a second observation value via the communications interface; and training the first RCM further based on the predicted observation value and the second observation value to provide the second RCM.

P: A method as recited in paragraph O, wherein the receiving the second observation value is performed after the providing the indication.

Q: A method as recited in any of paragraphs L-P, further comprising operating the second RCM to provide second state information, wherein the training the first NCM is further based on the second state information.

R: A method as recited in any of paragraphs L-Q, wherein individual ones of the expectation values indicate, represent, or correspond to the expected long term value of or resulting from taking the respective actions.

S: A method as recited in any of paragraphs L-R, wherein the expectation values comprise expectation long-term values.

T: A method as recited in any of paragraphs L-S, further comprising selecting the at least one action of the plurality of actions based at least in part on one or more of the expectation values.

U: A method as recited in paragraph T, further comprising selecting the at least one action having a highest of the expectation values.

V: A computer-readable medium having thereon computer-executable instructions, the computer-executable instructions upon execution configuring a computer to perform operations comprising: operating a first recurrent computational model (RCM) based at least in part on one or more values of training data to provide one or more state values and respective predicted result values; operating a first network computational model (NCM) based at least in part on the one or more state values to provide respective expectation vectors, at least one of the expectation vector including one or more expectation values corresponding to respective actions; training the first RCM based at least in part on the predicted result values and respective reference result values to provide a second RCM; and training the first NCM based at least in part on the state values, respective subsequent ones of the values of training data, and the respective reference result values to provide a second NCM.

W: A computer-readable medium as recited in paragraph V, the operations further comprising: selecting an action for at least one of the values of the training data based at least in part on the respective expectation vector; and training the first NCM further based on the selected respective action to provide the second RCM.

X: A computer-readable medium as recited in paragraph W, the operations further comprising selecting the action for at least one of the values of the training data having a highest-valued element of the respective expectation vector.

Y: A computer-readable medium as recited in any of paragraphs V-X, the operations further comprising: operating the second RCM based at least in part on at least one of the subsequent ones of the values of the training data to provide a second state value; and training the first NCM further based on the second state value to provide the second RCM.

Z: A computer-readable medium as recited in any of paragraphs V-Y, the operations further comprising: operating the first RCM to further provide a predicted training-data value; and training the first RCM further based on the predicted training-data value and the respective subsequent one of the values of the training data to provide the second RCM.

AA: A computer-readable medium as recited in any of paragraphs V-Z, wherein one or more of the plurality of values of the training data comprise respective sensor readings.

AB: A computer-readable medium as recited in any of paragraphs V-AA, wherein individual ones of the expectation values indicate, represent, or correspond to the expected long term value of or resulting from taking the respective actions.

AC: A computer-readable medium as recited in any of paragraphs V-AB, wherein the expectation values comprise expectation long-term values.

AD: A method, comprising: alternating training steps of a recurrent neural network and a Q network, wherein an output of the recurrent neural network is a training input of the Q network, and a result value corresponding to an output of the Q network is a training input of the recurrent neural network.

AE: A method as recited in paragraph AD, further comprising selecting, as the output of the Q network, an action of a plurality of actions having a highest expectation value.

AF: A method as recited in paragraph AD or AE, further comprising transmitting an indication of the output of the Q network via a communications interface.

AG: A method as recited in any of paragraphs AD-AF, further comprising receiving an input of the recurrent neural network via a communications interface.

AH: A computer-readable medium, e.g., a computer storage medium, having thereon computer-executable instructions, the computer-executable instructions upon execution configuring a computer to perform operations as any of paragraphs L-U recites.

AI: A device comprising: a processor; and a computer-readable medium, e.g., a computer storage medium, having thereon computer-executable instructions, the computer-executable instructions upon execution by the processor configuring the device to perform operations as any of paragraphs L-U recite.

AJ: A system comprising: means for processing; and means for storing having thereon computer-executable instructions, the computer-executable instructions including means to configure the system to carry out a method as any of paragraphs L-U recite.

AK: A computer-readable medium, e.g., a computer storage medium, having thereon computer-executable instructions, the computer-executable instructions upon execution configuring a computer to perform operations as any of paragraphs AD-AG recites.

AL: A device comprising: a processor; and a computer-readable medium, e.g., a computer storage medium, having thereon computer-executable instructions, the computer-executable instructions upon execution by the processor configuring the device to perform operations as any of paragraphs AD-AG recite.

AM: A system comprising: means for processing; and means for storing having thereon computer-executable instructions, the computer-executable instructions including means to configure the system to carry out a method as any of paragraphs AD-AG recite.

AN: A system, comprising: means for operating a first recurrent computational model (RCM) to provide first state information and a predicted result value; means for operating a first network computational model (NCM) to provide respective expectation values of a plurality of actions based at least in part on the first state information; means for providing an indication of at least one of the plurality of actions via a communications interface; means for receiving a reference result value via the communications interface; means for training the first RCM based at least in part on the predicted result value and the reference result value to provide a second RCM; and means for training the first NCM based at least in part on the first state information and the at least one of the plurality of actions to provide a second NCM.

AO: A system as recited in paragraph AN, further comprising: means for receiving a first observation value via the communications interface; and means for operating the first RCM further based on the first observation value to provide the first state information and the predicted result value.

AP: A system as recited in paragraph AO, wherein the first observation value comprises a sensor reading.

AQ: A system as recited in paragraph AO or AP, further comprising: means for operating the first RCM to further provide a predicted observation value; means for receiving a second observation value via the communications interface; and means for training the first RCM further based on the predicted observation value and the second observation value to provide the second RCM.

AR: A system as recited in paragraph AQ, wherein the means for receiving the second observation value are configured to receive the second observation value after the indication is provided.

AS: A system as recited in any of paragraphs AN-AR, further comprising means for operating the second RCM to provide second state information, wherein the means for training the first NCM are configured to train the first NCM further based on the second state information.

AT: A system as recited in any of paragraphs AN-AS, wherein individual ones of the expectation values indicate, represent, or correspond to the expected long term value of or resulting from taking the respective actions.

AU: A system as recited in any of paragraphs AN-AT, wherein the expectation values comprise expectation long-term values.

AV: A system as recited in any of paragraphs AN-AU, further comprising means for selecting the at least one action of the plurality of actions based at least in part on one or more of the expectation values.

AW: A system as recited in paragraph AV, further comprising means for selecting the at least one action having a highest of the expectation values.

AX: A system, comprising: means for alternating training steps of a recurrent neural network and a Q network, wherein an output of the recurrent neural network is a training input of the Q network, and a result value corresponding to an output of the Q network is a training input of the recurrent neural network.

AY: A system as recited in paragraph AX, further comprising means for selecting, as the output of the Q network, an action of a plurality of actions having a highest expectation value.

AZ: A system as recited in paragraph AX or AY, further comprising means for transmitting an indication of the output of the Q network via a communications interface.

BA: A system as recited in any of paragraphs AX-AZ, further comprising means for receiving an input of the recurrent neural network via a communications interface.

CONCLUSION

Various computational-model training and operation techniques described herein can permit more efficiently analyzing data, e.g., of an environment, and more readily determining control actions to be taken in that environment to achieve a goal. Various examples can provide more effective ongoing training of multiple computational models, e.g., based on sensor readings, providing improved accuracy with reduced computational power compared to training monolithic networks. Various examples operate multiple neural networks, permitting the operation of those neural networks to be carried out in parallel. This parallel operation can permit operating the neural network with reduced computational load and memory requirements compared to operating a monolithic neural network.

Although the techniques have been described in language specific to structural features and/or methodological acts, it is to be understood that the appended claims are not necessarily limited to the features and/or acts described. Rather, the features and acts are described as example implementations of such techniques. For example, network 108, processor 114, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, and/or 200 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more general purpose computers and/or processors. The code modules can be stored in any type of computer-readable storage medium and/or other computer storage device. Some and/or all of the methods can be embodied in specialized computer hardware.

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or a combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A system, comprising:
a communications interface;
one or more processing unit(s); and
one or more computer-readable media having thereon computer-executable instructions, the computer-executable instructions, upon execution, causing the one or more processing unit(s) to perform operations for coordinated training and operation of computational models, the operations comprising:
operating a first recurrent neural network (RNN) computational model on a first observation value to provide first state information and a first predicted result value;
operating a first Q network (QN) computational model on the first state information to provide respective expectation values of a plurality of actions;
selecting an action among the plurality of actions based on the expectation values and causing the communications interface to provide an indication of the selected action;
using a supervised-learning update rule to train the first RNN computational model based at least in part on the predicted result value and a corresponding reference result value received via the communications interface in response to the indication to provide a second RNN computational model;
operating the second RNN computational model on a second observation value received via the communications interface in response to the indication to provide second state information and a second predicted result value; and
using a reinforcement-learning update rule to train the first QN computational model based at least in part on the first state information, the second state information, the reference result value, and the selected action to provide a second QN computational model.

2. A system as recited in claim 1, wherein the selected action corresponds to a highest expectation value of the expectation values.

3. A system as recited in claim 1, wherein:
the first RNN computational model is further operated to provide a predicted observation value and the first RNN computational model is trained further based on the predicted observation value and the second observation value.

4. A system as recited in claim 3, further comprising a sensor coupled to the communications interface and configured to provide the second observation value.

5. A system as recited in claim 1, further comprising an actuator coupled to the communications interface and responsive to the indication of the selected action to perform the selected action.

6. A system as recited in claim 1, further comprising a result subsystem coupled to the communications interface and configured to provide the reference result value.

7. A method for coordinated training and operation of computational models, the method comprising:
operating a first recurrent neural network (RNN) computational model on a first observation value to provide first state information and a first predicted result value;
operating a first Q network (QN) computational model on the first state information to provide respective expectation values of a plurality of actions;
selecting an action among the plurality of actions based on the expectation values and providing an indication of the selected action via a communications interface;
receiving a first reference result value and a second observation value via the communications interface;
training the first RNN computational model, using a supervised-learning update rule, based at least in part on the first predicted result value and the first reference result value to provide a second RNN computational model;
operating the second RNN computational model on the second observation value to provide second state information and a second predicted result value; and
training the first QN computational model, using a reinforcement-learning update rule, based at least in part on the first state information, the second state information, the first reference result value, and the selected action to provide a second QN computational model.

8. A method as recited in claim 7, wherein the first observation value comprises a sensor reading.

9. A method as recited in claim 7, further comprising:
operating the first RNN computational model to further provide a predicted observation value; and
training the first RNN computational model further based on the predicted observation value and the second observation value to provide the second RNN computational model.

10. A method as recited in claim 7, wherein the receiving the second observation value is performed after the providing the indication.

11. A non-transitory computer-readable medium having thereon computer-executable instructions, the computer-executable instructions upon execution configuring a computer to perform operations for coordinated training and operation of computational models, the operations comprising:
operating a first recurrent neural network (RNN) computational model on a first observation value to provide first state information and a first predicted result value;
operating a first Q network (QN) computational model on the first state information to provide respective expectation values of a plurality of actions;
selecting an action among the plurality of actions based on the expectation values and providing an indication of the selected action via a communications interface;
receiving a first reference result value and a second observation value via the communications interface;
training the first RNN computational model, using a supervised-learning update rule, based at least in part on the first predicted result value and the first reference result value to provide a second RNN computational model;
operating the second RNN computational model on the second observation value to provide second state information and a second predicted result value; and
training the first QN computational model, using a reinforcement-learning update rule, based at least in part on the first state information, the second state information, the first reference result value, and the selected action to provide a second QN computational model.

12. A non-transitory computer-readable medium as recited in claim 11, wherein one or more of the plurality of values of the training data comprise respective sensor readings.

* * * * *